US008392204B2

(12) United States Patent
Camp et al.

(10) Patent No.: US 8,392,204 B2
(45) Date of Patent: Mar. 5, 2013

(54) SYSTEM AND METHOD FOR MANAGING AND TRACKING CHILD WELFARE SERVICES

(75) Inventors: Lloyd R. Camp, Johnston, IA (US); Stephen Goldsmith, Indianapolis, IN (US); David D. Schneider, Edmond, OK (US)

(73) Assignee: ACS State & Local Solutions, Inc., Washington, DC (US)

( * ) Notice: Subject to any disclaimer, the term of this patent is extended or adjusted under 35 U.S.C. 154(b) by 1398 days.

(21) Appl. No.: 10/804,455

(22) Filed: Mar. 19, 2004

(65) Prior Publication Data

US 2004/0267569 A1 Dec. 30, 2004

Related U.S. Application Data

(60) Provisional application No. 60/458,512, filed on Mar. 19, 2003.

(51) Int. Cl.
 *G06Q 10/00* (2012.01)
(52) U.S. Cl. ............................................. 705/1.1; 705/2
(58) Field of Classification Search ................ 705/1, 1.1, 705/2
 See application file for complete search history.

(56) References Cited

U.S. PATENT DOCUMENTS

| | | | | |
|---|---|---|---|---|
| 5,915,010 | A | * | 6/1999 | McCalmont ............ 379/212.01 |
| 6,042,005 | A | * | 3/2000 | Basile et al. ................. 235/382 |
| 6,335,688 | B1 | * | 1/2002 | Sweatte ...................... 340/573.1 |
| 6,463,474 | B1 | * | 10/2002 | Fuh et al. ...................... 709/225 |
| 2002/0013716 | A1 | * | 1/2002 | Dunham et al. ................... 705/2 |
| 2003/0037063 | A1 | * | 2/2003 | Schwartz .................... 707/104.1 |
| 2003/0061172 | A1 | * | 3/2003 | Robinson ........................ 705/67 |

OTHER PUBLICATIONS

Plotnick, Robert D. and Laurie Deppman. "Using benefit-cost analysis to assess child abuse prevention and intervention programs", Child Welfare. Washington: May/Jun. 1999. vol. 78, Iss. 3; p. 381.*
Savas, E S. "Competition and choice in New York City social services" Public Administration Review. Washington: Jan./Feb. 2002. vol. 62, Iss. 1; p. 82, 10 pgs.*
Rau, Jordan. "Downloading Disasters / How computers hinder state workers trying to do their jobs; [All Editions]" Albany Bureau. Newsday. (Combined editions). Long Island, N.Y.: Dec. 4, 2000. p. A.07.*
"Oracle Chosen by New York State as Standard Database for Entire Social Services Department" PR Newswire. New York: Aug. 10, 1998. p. 1.*
Woods, Theodore W. "The justification, ranking & budgeting process for IT at the Virginia Housing Development Authority" Journal of Systems Management. Cleveland: May/Jun. 1996. vol. 47, Iss. 3; p. 42, 7 pgs.*
National Child Support Enforcement Association, NCSEA News, Summer 1997 Conference Edition, vol. XXVII, No. 3 (4 pages).
Public Law 104-193—Aug. 22, 1996, 110 Stat. 2105, 104th Congress (251 pages).
Complaint for Declaratory Judgment and Patent Infringement, *JPMorgan Chase & Co. et al.* v. *Affiliated Computer Services, Inc. et al.*; (U.S.D.C. Del., Apr. 2008) (33 pages).

* cited by examiner

*Primary Examiner* — Gabrielle McCormick
(74) *Attorney, Agent, or Firm* — Finnegan, Henderson, Farabow, Garrett & Dunner, L.L.P.

(57) ABSTRACT

A method of monitoring the provision of child welfare services to a child. The method includes: receiving child update information on the child, the child update information including reporter information and child status information; storing the child update information in a central database; and providing a report based on the stored child update information.

20 Claims, 25 Drawing Sheets

SYSTEM AND METHOD FOR MANAGING AND TRACKING CHILD WELFARE SERVICES

RELATED APPLICATIONS

This patent application claims the benefit of priority of U.S. Provisional Application No. 60/458,512, filed Mar. 19, 2003, which is incorporated herein by reference.

TECHNICAL FIELD

The invention relates to the field of child welfare, and more specifically, a system for and method of acquiring data regarding child welfare, storing the acquired data, and providing reporting functions based on the stored acquired data.

BACKGROUND

Child welfare agencies across the nation are faced with many challenges, including ever increasing demands for child safety and public accountability. In spite of the talents, dedication, and efforts of a great majority of child welfare professionals, child welfare programs lack the mechanisms and resources to effectively enforce accountability, monitor integrity, and provide quality assurance for its most critical stakeholder group: children in placement.

Currently, there are few effective strategies for ensuring that caseworkers' required visits to foster homes are performed according to regulation and that these visits are documented properly, professionally, and with integrity. Perhaps more importantly, child welfare agencies do not have systems in place to effectively monitor, record, and report the whereabouts and well being of children in placement on a regular basis. Beyond the important goal of tracking children, child welfare agencies do not have systems to track delivery of case plan services and events for children. Such systems are needed to provide accurate reporting and tracking of case plan deliveries and to close the window of time during which children might befall misfortune.

Florida's Blue Ribbon Panel on Child Protection wrote on Jan. 13, 2003 in a Progress Report that the State needs to analyze "capacity to support field operations and community care providers with quality assurance, quality monitoring and fiscal staff." (Page 9). The report also highlighted the need to make medical records available to caregivers page 11); provide immediate notification in the case of missing children (page 14); and maintain current photographs of children for identification purposes (page 16). All programs and systems that are currently lacking and sorely needed.

Unfortunately, child welfare agencies, like virtually all government agencies, are presently cash-strapped. Even if systems addressing the needs described above were to exist, most agencies would be unable to afford them. Therefore, such tracking systems should assist the state in achieving federal funding reimbursement opportunities. Monitoring, recording, and reporting capabilities are needed to effectuate compliance with federal grant and reimbursement monies.

The present invention is directed to overcoming one or more of the above problems and achieving one or more of the above stated goals.

SUMMARY

A method of monitoring the provision of child welfare services to a child, consistent with the present invention, includes: receiving child update information on the child, the child update information including reporter information and child status information; storing the child update information in a central database; and providing a report based on the stored child update information.

A system for monitoring the provision of child welfare services to a child, consistent with the present invention, comprises: a memory; a database; and a processor coupled to the memory and the database. The processor is configured to: receive child update information on the child, the child update information including reporter information and child status information; store the child update information in a central database; and provide a report based on the stored child update information.

The foregoing summarizes only a few aspects of the invention and is not intended to be reflective of the full scope of the invention as claimed. Additional features and advantages of the invention are set forth in the following description, may be apparent from the description, or may be learned by practicing the invention. Moreover, both the foregoing summary and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate a system entitled Child Track$^{SM}$ consistent with the invention and, together with the description, serve to explain the principles of the invention.

FIG. 15 illustrates an exemplary scannable child services card consistent with an exemplary embodiment consistent with the present invention.

FIG. 21 is a child event report screen consistent with the present invention.

FIG. 23 is an attendance report screen consistent with the present invention.

DETAILED DESCRIPTION

Figure 1A:
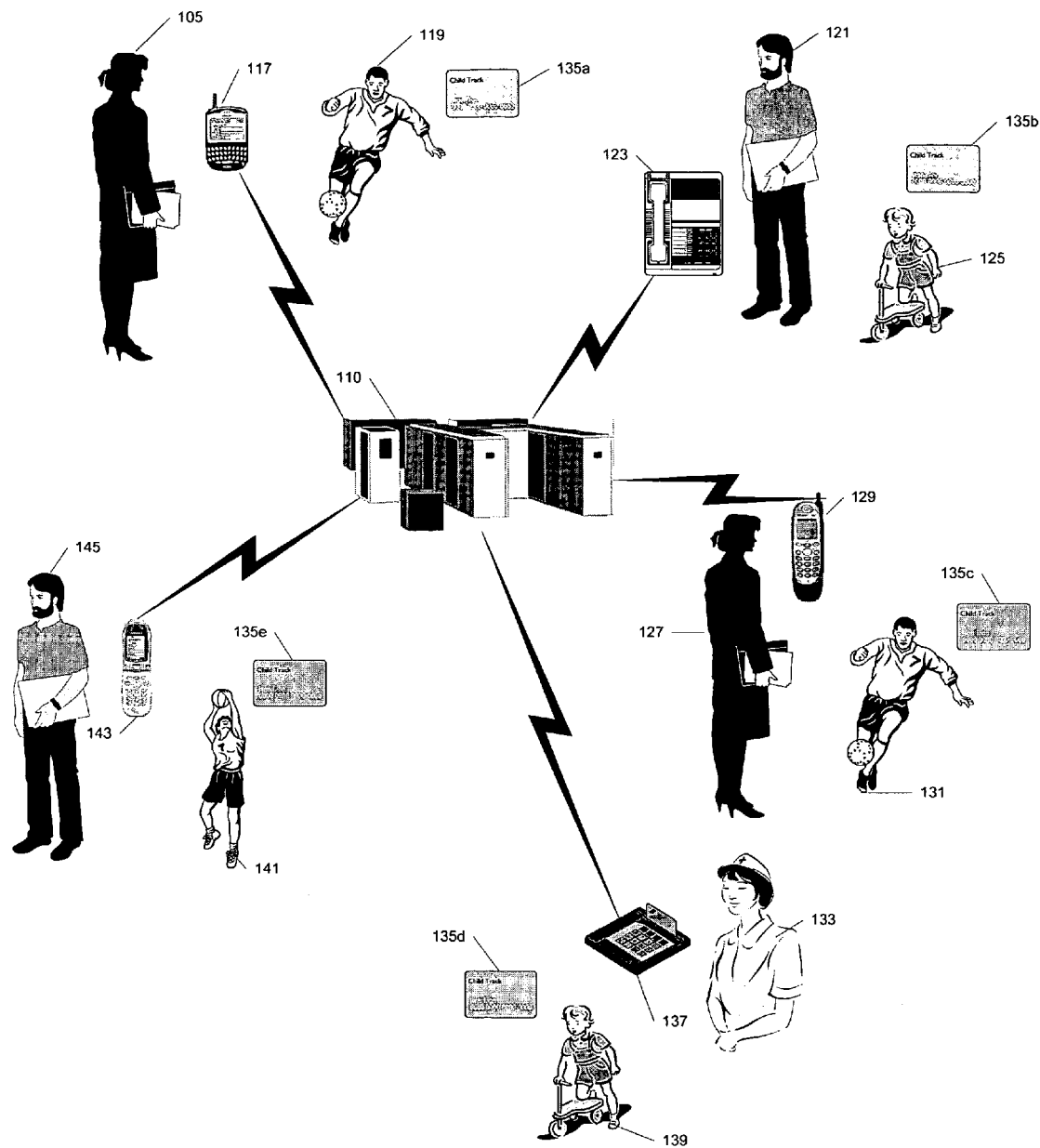
FIG. 1a is an illustration of an exemplary embodiment consistent with the present invention in its operating environment.

Reference will now be made in detail to the present exemplary embodiments consistent with the invention, examples of which are illustrated in the accompanying drawings. Wherever possible, the same reference numbers will be used throughout the drawings to refer to the same or like parts.

Consistent with an aspect of the present invention, a system is provided to monitor and record child welfare services. The system may receive from a reporter, such as a child welfare worker, a foster parent, or a group home worker; child update information, including reporter information and child status information. The reporter information may include a case identifier, a Personal Identification Number (PIN) of the reporter, the reporting terminal's identifier (e.g., Caller ID, POS identifier, TCP/IP Address), and a GPS location of the reporting terminal. The child status information may include information about the health of the child, the status of the child, information about the child's environment, and a picture of the child.

Child update information may be entered by a reporter from a telephone through an interactive voice response (IVR) system, from a point of sale (POS) terminal, or through a network based interface such as a web browser or specialized program. In addition, a caseworker, foster parent, or a group home worker may utilize a camera and/or scanner-equipped mobile platform, such as a GSM telephone, to enter child update information.

Once the child update information is received, the system stores this information in a database table associated with the child.

The system may automatically scan its database for children about whom update information has not been received for a period of time. For those nonreported children, the system may generate an alert. Depending upon the time period, the alert may simply prompt contact with the foster parent or group home to enter child update information; however, should the period of time be extensive, the system may generate an alert to child welfare services of a potential problem.

Embodiments consistent with the present invention increase accountability, integrity, and quality assurance within child welfare services, by monitoring the services provided to children in placement on a routine basis. A system consistent with the present invention, known as Child Track^SM, may utilize interactive voice response (IVR) and Electronic Payment Processing and Information Control (EP-PIC™) technology to allow foster families, group homes, and child welfare caseworkers to report the status of a foster child and to validate that services are being delivered to the child in accordance with state and federal policies and regulations. Through ongoing monitoring and case tracking of children within child welfare services, compliance with case plans can be verified and assured.

Furthermore, using the more advanced capabilities of the system, Child Track^SM offers child welfare services the opportunity to integrate the services and benefits designated for a child's foster care case onto a single electronic delivery mechanism, providing a centralized disbursement and tracking system for payments, e.g., cash benefits, clothing allowances, eligibility data, Medicaid services, and immunization records. This level of integration empowers child welfare services to have access to data to monitor that all children in its child welfare program are being cared for adequately and appropriately.

Additionally, Child Track^SM offers child welfare services the opportunity to qualify for and receive additional federal funding through reimbursements to offset costs of implementing embodiments of the present invention. Child Track^SM may offer comprehensive fiscal and administrative planning services to attempt to increase funding and return on investment for child welfare services.

Child Track^SM maintains controls to help ensure that all children in foster care are accounted for on a regular basis through event tracking, assisting in the appropriate safety, security, and case documentation with each contact. It may also maintain controls and quality assurance practices to ensure that caseworkers' site visits are performed according to regulations and with due integrity, using automation and technology to provide quality assurance capabilities while easing caseworkers' administrative burdens. In addition, embodiments may permit data access to accommodate the secure sharing of case-related data among caseworkers, supervisors, officers of the court, and law enforcement agencies to keep the parties appropriately informed within the required timeframes in the event of irregular or potentially harmful situations. Systems consistent with the present invention may also provide fiscal planning analyses and institute program and case documentation practices to increase federal reimbursement for program expenses.

FIG. 1a is an illustration of a system 110, known as Child Track^SM, consistent with the present invention in its operating environment. Child Track^SM system 110 may interface with one or more external systems, institutions, or individuals (collectively "stakeholders") in order to track events that occur in the life of the child by receiving, recording, maintaining, reporting, and providing child records and caretaker records. For example, a caseworker stakeholder 105 may utilize an alphanumeric pager 117, such as a RIM pager, to provide an event, e.g. a child information update, to Child Track[SM] system 110. Caseworker 105 reads and uploads an event marked by a case identification number from a case identification card, or Child Track[SM] card 135a, held by child 119. The case identification number is unique to each child in the system.

In another example, a caregiver stakeholder 121 (for example a foster parent) may utilize a telephone 123 to access the Interactive Voice Response (IVR) features of Child Track[SM] system 110 to input a child information update event on a child 125 with a Child Track[SM] card 135b.

In yet another example, law enforcement officer stakeholder 127 may utilize a scanner-equipped, data-enabled mobile platform 129 to scan a Child Track[SM] card 135c of a child 131 to make an inquiry about the child, thus retrieving the child's records from Child Track[SM] system 110. This event, like the others previously described is logged in Child Track[SM] system 110 to maintain records of the child's life events.

In another example, medical officer 133 may utilize Point of Sale (POS) terminal 137 to scan a Child Track[SM] card 135e of a child 139 to input a child information update about the child following medical treatment, thus providing child welfare system authorities with a record of the treatment and yet another event in the life of the child.

In another example, casework stakeholder 145 may utilize a mobile platform 143 to access the web server features of Child Track[SM] system 110 to input a child information update on a child 141 with a Child Track[SM] card 135e. The mobile platform may include a camera for photographing the image of a child for uploading to Child Track[SM] system 110.

The continuous monitoring of the child by all stakeholders permits child care authorities to centrally monitor the life of a child and application of a child's case plan.

Figure 1B:
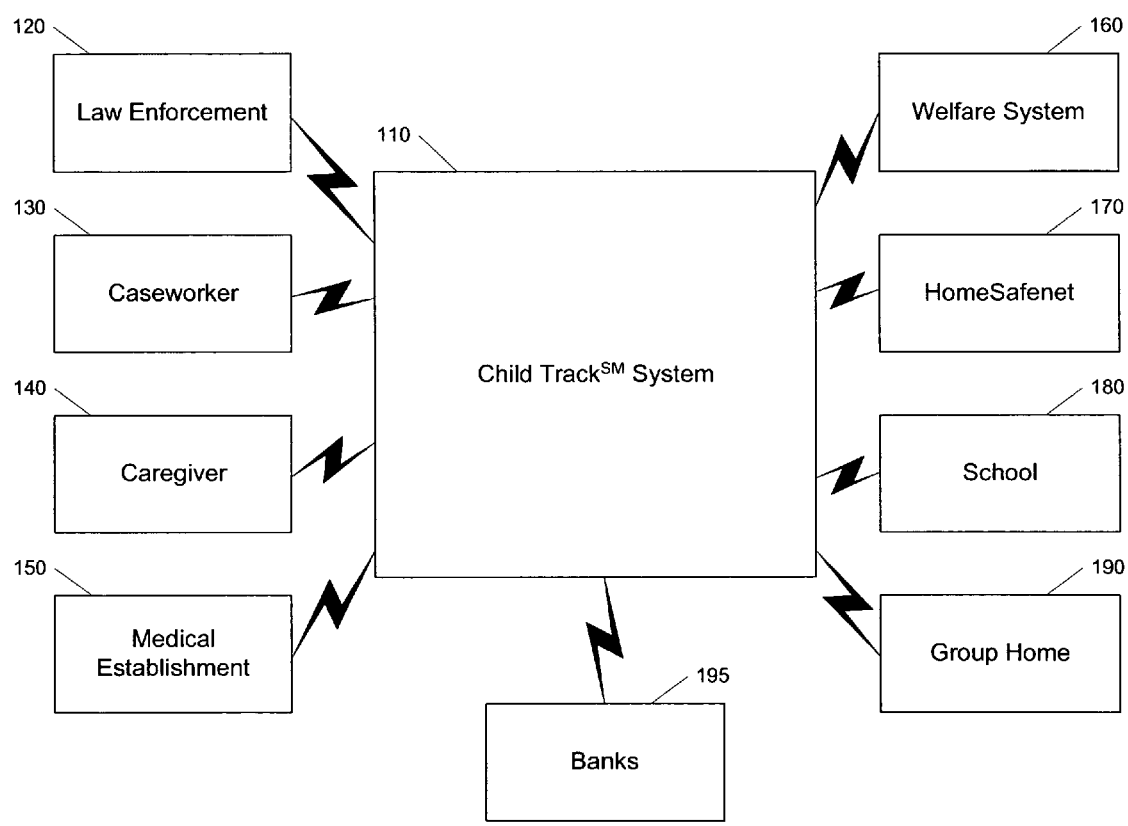
FIG. 1b is a system diagram of functional elements within an exemplary embodiment consistent with the present invention.

FIG 1b is a system diagram of functional elements within an exemplary embodiment consistent with the present invention. As described above, Child Track[SM] system 110 provides a system for tracking a child through monitoring, recording, and reporting on the status of children within the care of the child welfare services. Child Track[SM] system 110 may interface with stakeholders in order to facilitate its operation. These stakeholders may include law enforcement officers 120, caseworkers 130, caregivers 140, medical establishments 150, welfare systems 160, the HomeSafenet system 170 (a child welfare and client management information system, for example to monitor child abuse and neglect cases, developed by the Department of Children and Family Services of the State of Florida), schools 180, group homes or foster care homes 190, and financial institutions such as banks 195.

Law enforcement officers 120, caseworkers 130, caregivers 140, schools, medical establishments 150, members of the welfare system 160, schools 180, and group homes 190 may interface to Child Track[SM] system with one or more communication tools, including: data enabled mobile platforms, such as mobile telephones, personal digital assistants (PDA's), or alphanumeric pagers, such as the Research In Motion (RIM) pager; telephone systems utilizing interactive voice response, both landline and mobile, through the public switch telephone network (PSTN); or a network, such as the Internet, via a web browser or a dedicated application.

Child Track[SM] system 110 may also interface to servers and databases of the welfare system 160 to communicate information. In addition, Child Track[SM] system 110 may interface to HomeSafenet 170 to interchange information.

Figure 2:
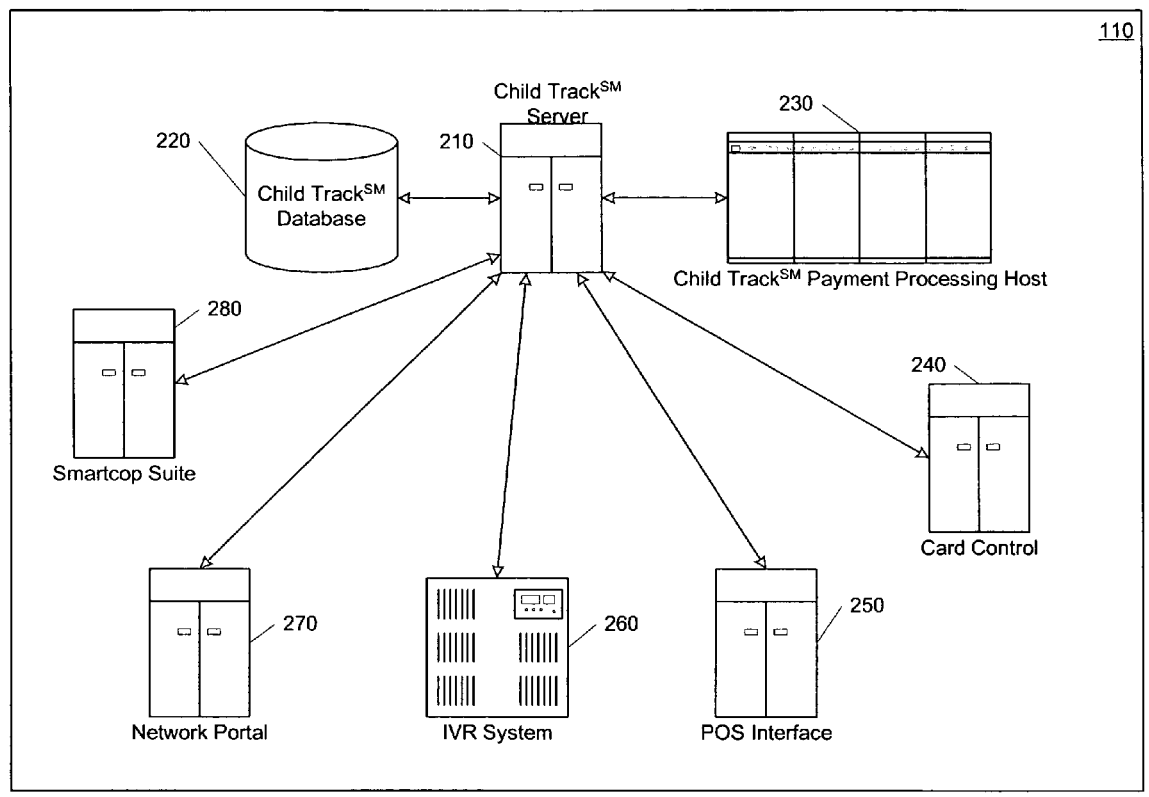
FIG. 2 is a system diagram of hardware elements within Child Track$^{SM}$ system in an exemplary embodiment consistent with the present invention.

FIG. 2 is a system diagram of components within Child Track[SM] system 110. Child Track[SM] system 110 may comprise one or more elements to provide desired functionality. At the center of Child Track[SM] system 110 is a Child Track[SM] server 210 and a Child Track[SM] database 220. These two elements provide functionality of Child Track[SM] system 110, which may include: maintenance of caregiver records, where the caregiver may be a foster parent or group home, for example; maintenance of child records; maintenance of payment authorization records; maintenance of activity files associated with each child and each caregiver; and reporting.

Caregiver records may include: caregiver name, group home affiliation, caregiver personal identification number, one or more caregiver telephone numbers, caregiver address, the names and identifications of one or more children in the caregiver's custody, and other information that would be useful and well known to those skilled in the art. Child records may include: child's name, child's case identification number, caregiver name and personal identification number, address, telephone number, one or more child updates, and other information that would be useful and well known to those skilled in the art. Child Track[SM] database 220 may feature an SQL database, Oracle database, or other database known to those skilled in the art.

In addition, Child Track[SM] server 210, via additional Child Track[SM] system elements, may interface with mobile devices, Smartcop-enabled devices; networks, such as the Internet; telephones via interactive voice response; point of sale systems; card control mechanisms to issue and control child data cards; and banks via payment processing systems. A mobile platform interface application, such as Smartcop, permits wired and wireless access to Child Track[SM] server 210 to permit the remote access and updating of child and caregiver records by law enforcement officers and others. Child Track[SM] server may also interface to child welfare system computers.

Child Track[SM] server 210 may interface to mobile platforms via a mobile platform interface application server 280, such as mobile platform interface application server. Via mobile platform interface application server 280, data may be exchanged between end users, or reporters, and Child Track[SM] server 210. For example, mobile platform interface application server 280 may be used to upload child update information to Child Track[SM] server 210. Also, mobile platform interface application server 280 may be used to facilitate child record or caregiver record requests from Child Track[SM] server 210. By uniquely facilitating the wireless data exchange of child records and caregiver records between a reporter using a mobile platform, such as a data enabled mobile telephone, PDA, or RIM pager, mobile platform interface application server 280 permits mobile access to critical child records.

A Network Portal 270 facilitates interfacing Child Track[SM] server 210 to a network, such as the Internet. Via Network Portal 270, reporters can perform functions comparable to those available via mobile platform interface application server 280. For example, child records can be exchanged between end users, or reporters, and Child Track[SM] server 210. Also, Network Portal 270 may be used to upload child update information to Child Track[SM] server 210 using a dedicated program or a web browser. By using a web browser, reporters can access information virtually anyplace. In addition, Network Portal 270 may be used to facilitate child record or caregiver record requests from Child Track[SM] server 210. By uniquely facilitating the data exchange of child records and caregiver records between a reporter using a networked device, such as a web enabled mobile phone or PC, with a web browser or dedicated program, Network Portal 270 permits anywhere access to critical child records.

An IVR system 260 facilitates interfacing Child Track$^{SM}$ server 210 to a telephone system through, for example, the Public Switched Telephone Network (PSTN) to enable access to child or caregiver records from any telephone, mobile or landline. Via IVR system 260, reporters can perform functions comparable to those available via mobile platform interface application server 280 or Network Portal 270. For example, child records can be exchanged between end users, or reporters, and Child Track$^{SM}$ server 210. Also, IVR System 260 may be used to input child update information to Child Track$^{SM}$ server 210 using the telephone touch pad or voice commands. By using a telephone, reporters can access information virtually anyplace. In addition, IVR System 260 may be used to facilitate child record or caregiver record requests from Child Track$^{SM}$ server 210. By uniquely facilitating the data exchange of child records and caregiver records between a reporter using a telephone, IVR system 260 permits anywhere access to critical child records.

A Card Control system 240 may interface to Child Track$^{SM}$ server 210 to create and manage cards, unique to each child. These Child Track$^{SM}$ cards may contain a photograph of the child, his name, and a case identification number that is unique to each child and encoded on the card through one or more of the following: printing on the card, bar coding on the card, embedding within a magnetic strip on the card, or storing within a chip inside or mounted upon the card. These Child Track$^{SM}$ cards may also contain a smart chip in the card that maintains child records, either a full image of the child records maintained on Child Track$^{SM}$ database 220 or a subset of that image, or caregiver records for the caregiver associated with the child. A smartcard reader/writer may read this data off of the cards without the need to contact Child Track$^{SM}$ server 210. In addition, should Child Track$^{SM}$ server 210 be unavailable for update, Child Track$^{SM}$ cards may be used to store newly entered child records for later upload to Child Track$^{SM}$ server 210. Card Control system 240 may create the cards and maintain the cards.

A POS Interface 250 facilitates interfacing Child Track$^{SM}$ server 210 to point of sale terminals through, for example, the Public Switched Telephone Network (PSTN) to enable access to child or caregiver records from POS systems located in schools, welfare system offices, medical establishments, or portable POS systems associated with reporters such as might be integrated with reporter mobile platforms. Via POS Interface 250, reporters can "swipe" a Child Track$^{SM}$ card of a child in order to initiate the entry of child update information. By swiping the card, there is some degree of verification that a reporter is actually in the vicinity of a child.

A Child Track$^{SM}$ Payment processing host 230 interfaces with Child Track$^{SM}$ server 210 and outside financial institutions, such as banks to deliver benefits for the child. Cash benefits and clothing allowances can be given through these institutions.

Figure 3:
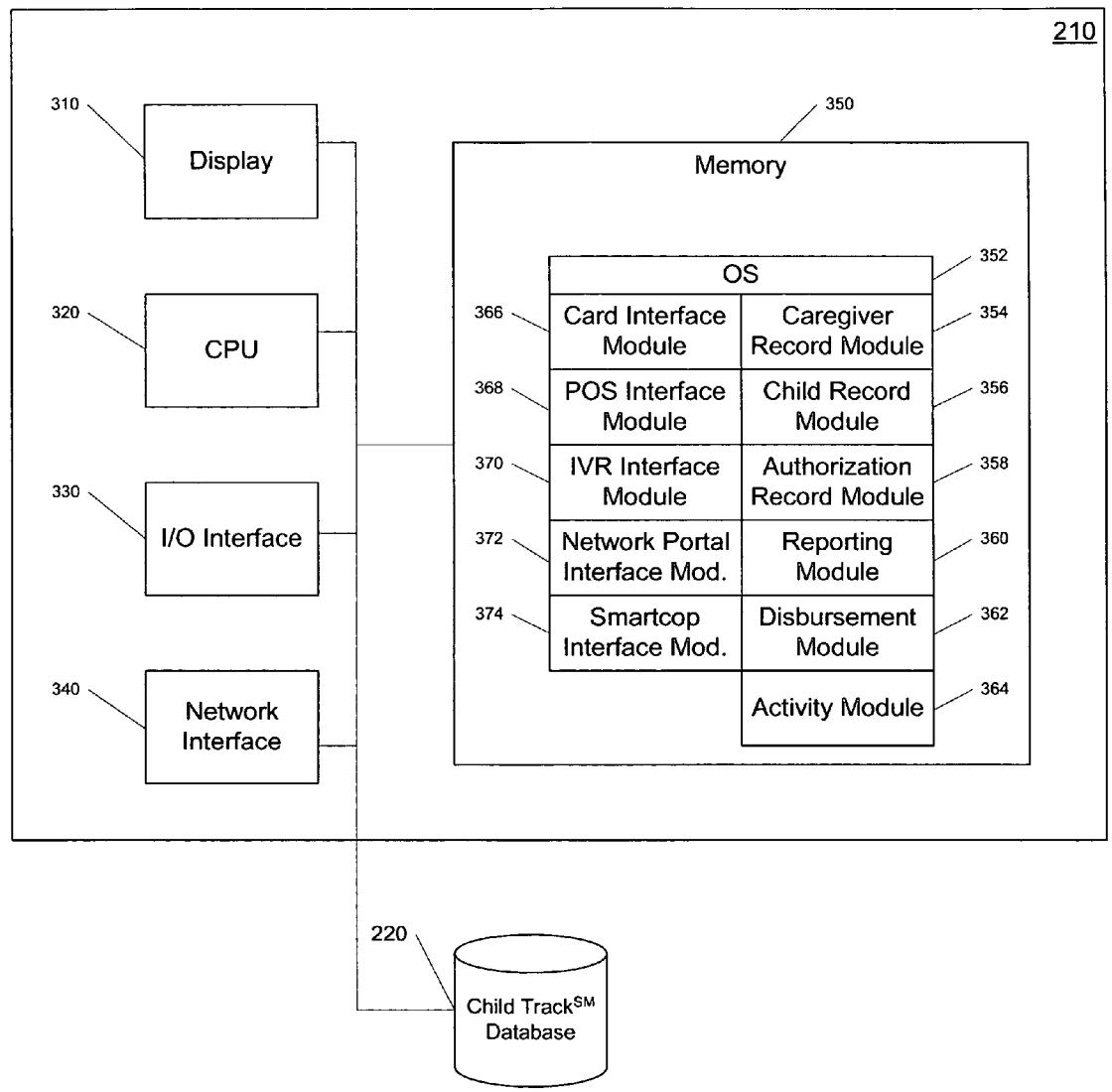
FIG. 3 is a system embodiment of a Child Track$^{SM}$ server consistent with an exemplary embodiment consistent with the present invention.

FIG. 3 is a block diagram of Child Track$^{SM}$ server 210. As illustrated in FIG. 3, a system environment of Child Track$^{SM}$ server 210 may include a display 310, a central processing unit 320, an input/output interface 330, a network interface 340 and memory 350 coupled together by a bus. Child Track$^{SM}$ server 210 is adapted to include the functionality and computing capabilities to implement the described monitoring and recording functions of Child Track$^{SM}$ server and to access, read, and write to Child Track$^{SM}$ database 220. The input, output, and monitoring of the system may be provided on display 310 for viewing.

As shown in FIG. 3, Child Track$^{SM}$ server 210 may comprise a PC or mainframe computer for performing various functions and operations of the invention. Child Track$^{SM}$ server 210 may be implemented, for example, by a general purpose computer selectively activated or reconfigured by a computer program stored in the computer, or may be a specially constructed computing platform for carrying-out the features and operations of the present invention. Child Track$^{SM}$ server 210 may also be implemented or provided with a wide variety of components or subsystems including, for example, one or more of the following: one or more central processing units 320, a co-processor, memory 350, registers, and other data processing devices and subsystems. Child Track$^{SM}$ server 210 may also communicate or transfer caregiver records, child records, authorization records, activity records, and reports via I/O interface 330 and/or network interface 340 through the use of direct connections or communication links to other elements of Child Track$^{SM}$ system. For example, a firewall in network interface 340, prevents access to the platform by unpermitted outside sources.

Alternatively, communication between Child Track$^{SM}$ server 210 and modules 310, 330, and 340 can be achieved through the use of a network architecture (not shown). In the alternative embodiment (not shown), the network architecture may comprise, alone or in any suitable combination, a telephone-based network (such as a PBX or POTS), a local area network (LAN), a wide area network (WAN), a dedicated intranet, and/or the Internet. Further, it may comprise any suitable combination of wired and/or wireless components and systems. By using dedicated communication links or shared network architecture, Child Track$^{SM}$ server 210 may be located in the same location or at a geographically distant location from modules 310, 330, and 340.

I/O interface 330 of the system environment shown in FIG. 3 may be implemented with a wide variety of devices to receive and/or provide the data to and from Child Track$^{SM}$ server 210. I/O interface 330 may include an input device, a storage device, and/or a network. The input device may include a keyboard, a mouse, a disk drive, video camera, magnetic card reader, or any other suitable input device for providing records to Child Track$^{SM}$ server 210.

Network interface 340 may be connected to a network, such as a Wide Area Network, a Local Area Network, or the Internet for providing read/write access to records.

A Memory device 350 may be implemented with various forms of memory or storage devices, such as read-only memory (ROM) devices and random access memory (RAM) devices. Memory device 350 may also include a memory tape or disk drive for reading and providing records on a storage tape or disk as input to Child Track$^{SM}$ server 210. Memory device 350 may comprise: an operating system 352, a caregiver record module 354 for reading, writing, and updating caregiver records; a child record module 356 for reading, writing, and updating child records; an authorization record module 358 for reading, writing, and calculating payment authorizations for a child; a reporting module 360 for providing a variety of predefined and user defined reports and for facilitating child record checks to generate alerts when child update reports are tardy; a disbursement module 362 for monitoring disbursements; an activity module 364 for maintaining a general record of activity within Child Track$^{SM}$ server 210; a card interface module 366 for interfacing the card control system 240; a POS Interface module 368 for communicating with the POS Interface 250; an IVR Interface module 370 for communicating with IVR System 260; a Network Portal Interface module 372 for communicating with Network Portal 270; and a mobile application interface module 374 for communicating with mobile platform interface application 280.

Figure 4:
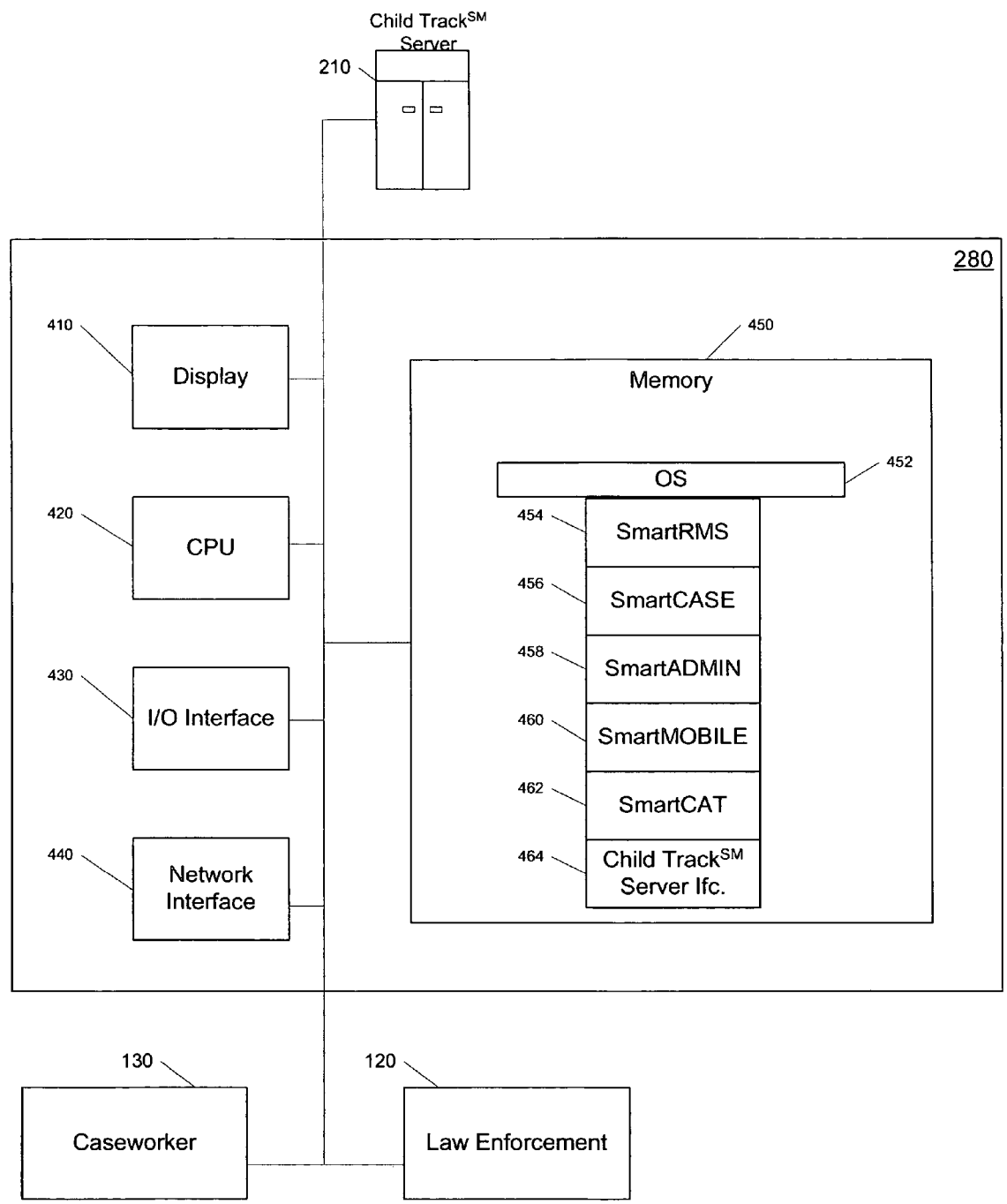
FIG. 4 is a system embodiment of a law enforcement and wireless interface, for example mobile platform interface application, consistent with an exemplary embodiment consistent with the present invention.

FIG. 4 is a block diagram of a mobile platform interface application consistent with an exemplary embodiment consistent with the present invention. As illustrated in FIG. 4, mobile platform interface application 280 may include a display 410, a central processing unit 420, an input/output interface 430, a network interface 440 and memory 450 coupled together by a bus. mobile platform interface application 280 is adapted to include the necessary functionality and computing capabilities to implement mobile platform interface application of functions of Child Track$^{SM}$ system consistent with the present invention by communicating with Child Track$^{SM}$ server 210 and law enforcement systems 120 and caseworker systems 130. The input, output, and monitoring of the system may be provided on display 410 for viewing.

Mobile platform interface application server 280 gives law enforcement agencies a complete, integrated real-time information tool. This technology helps agencies and officers save lives, prevent crime, increase efficiency and accuracy, and reduce paperwork. Critical information is delivered where and when it is needed. The integration of mobile application interface server 280 provides accuracy of data from a single point of entry. Information stored in mobile platform interface application server 280 is easily accessible by authorized users. Secure data can be shared among state, county, and municipal agencies as well as regionally among states. Mobile platform interface application server 280 also offers database search capabilities utilizing the latest data mining technology. Mobile platform interface application server 280 may provide live computer aided dispatch on mobile platforms held by officers. This feature allows officers to see calls as the information is entered into the system. Live updates may automatically be delivered to vehicles without user interaction. Computer aided dispatch information in the vehicles is accurate. It assists first responders and supervisors in making informed enforcement and operational decisions. The mobile platform interface application server 280 may be Smartcop Server which is commercially available from Smartcop Headquarters at 270 N. Palafox Street, Pensacola, Fla. 32501, phone 1-877-762-7826, or by viewing the web site at www.smartcop.com As shown in FIG. 4, mobile platform interface application 280 may comprise a PC or mainframe computer for performing various functions and operations of the invention. mobile platform interface application 280 may be implemented, for example, by a general purpose computer selectively activated or reconfigured by a computer program stored in the computer, or may be a specially constructed computing platform for carrying-out the features and operations of the present invention. mobile platform interface application 280 may also be implemented or provided with a wide variety of components or subsystems including, for example, one or more of the following: one or more central processing units 420, a co-processor, memory 450, registers, and other data processing devices and subsystems. mobile platform interface application 280 also communicates or transfers caregiver records and child records via I/O interface 430 and/or network interface 440 through the use of direct connections or communication links to other elements of Child Track$^{SM}$ system, for example caseworker systems 130 and law enforcement systems 120. In an exemplary embodiment of the invention, a firewall in, for example, network interface 440, prevents access to the platform by unpermitted outside sources.

Alternatively, communication between mobile platform interface application 280 and modules 410, 430, and 440 can be achieved through the use of a network architecture (not shown). In the alternative embodiment (not shown), the network architecture may comprise, alone or in any suitable combination, a telephone-based network (such as a PBX or POTS), a local area network (LAN), a wide area network (WAN), a dedicated intranet, and/or the Internet. Further, it may comprise any suitable combination of wired and/or wireless components and systems. By using dedicated communication links or shared network architecture, mobile platform interface application 280 may be located in the same location or at a geographically distant location from modules 410, 430, and 440.

I/O interface 430 of the system environment shown in FIG. 4 may be implemented with a wide variety of devices to receive and/or provide the data to and from mobile platform interface application 280. I/O interface 430 may include an input device, a storage device, and/or a network. The input device may include a keyboard, a mouse, a disk drive, video camera, magnetic card reader, or any other suitable input device for providing records to mobile platform interface application 280.

Network interface 440 may be connected to a network, such as a Wide Area Network, a Local Area Network, or the Internet for providing read/write access to records.

Memory device 450 may be implemented with various forms of memory or storage devices, such as read-only memory (ROM) devices and random access memory (RAM) devices. Memory device 450 may also include a memory tape or disk drive for reading and providing records on a storage tape or disk as input to mobile platform interface application 280. Memory device 450 may comprise an Operating System 452 and one or more of the following mobile interface application elements, such as SmartRMS 454, SmartCASE 456, SmartADMIN 458, SmartMOBILE 460, SmartCAT 462, and Child Track$^{SM}$ server interface 464 for linking to Child Track$^{SM}$ server 210.

SmartCASE 456 provides case setup, records entry, investigations, and linkage to other components. SmartMOBILE 460 provides wired and wireless connectivity to facilitate automated data capture and data query in the field with time and location validation of transactions. SmartCAT 462, a computer aided tracking module, provides a real-time or near real-time situation display capable of supporting incoming calls for service (e.g., 911), instantaneous and secure dispatch communications, tracking location and display information, and interoperability with law enforcement agencies. SmartRMS 454, a records management system, is a suite of software modules that manages reporting and reduces the time officers spend preparing reports.

Figure 5:
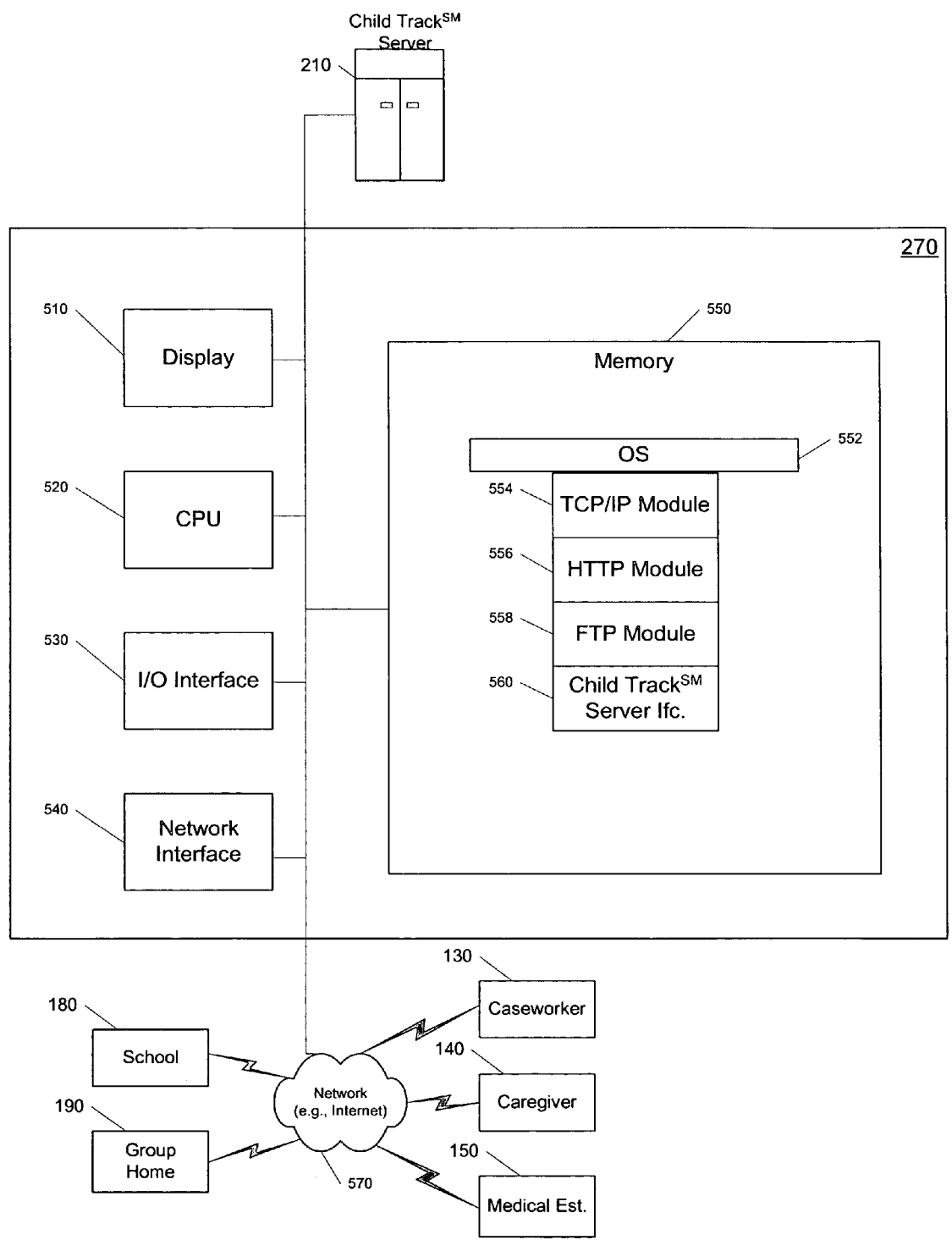
FIG. 5 is a system embodiment of an Internet portal consistent with an exemplary embodiment consistent with the present invention.

FIG. 5 is a block diagram of a Network Portal 270 consistent with an exemplary embodiment consistent with the present invention. As illustrated in FIG. 5, a Network Portal 270 may include a display 510, a central processing unit 520, an input/output interface 530, a network interface 540 and memory 550 coupled together by a bus. Network Portal 270 is adapted to include the necessary functionality and computing capabilities to implement a network interface to, for example the Internet, to allow Child Track$^{SM}$ server 210 to communicate with school systems 180, group homes 190, caseworkers 130, caregivers 140, and medical establishments 150 via network 570. The input, output, and monitoring of the system may be provided on display 510 for viewing.

As shown in FIG. 5, Network Portal 270 may comprise a PC or mainframe computer for performing various functions and operations of the invention. Network Portal 270 may be implemented, for example, by a general purpose computer selectively activated or reconfigured by a computer program stored in the computer, or may be a specially constructed computing platform for carrying-out the features and operations of the present invention. Network Portal 270 may also be implemented or provided with a wide variety of components or subsystems including, for example, one or more of the following: one or more central processing units 520, a co-processor, memory 550, registers, and other data processing devices and subsystems. Network Portal 270 also communicates or transfers caregiver records and child records via I/O interface 530 and/or network interface 540 through the use of direct connections or communication links to other elements of Child Track[SM] system, for example caseworker systems 130 and caregiver 140. In an exemplary embodiment of the invention, a firewall in, for example, network interface 540, prevents access to the platform by unpermitted outside sources.

Alternatively, communication between Network Portal 270 and modules 510, 530, and 540 can be achieved through the use of a network architecture (not shown). In the alternative embodiment (not shown), the network architecture may comprise, alone or in any suitable combination, a telephone-based network (such as a PBX or POTS), a local area network (LAN), a wide area network (WAN), a dedicated intranet, and/or the Internet. Further, it may comprise any suitable combination of wired and/or wireless components and systems. By using dedicated communication links or shared network architecture, Network Portal 270 may be located in the same location or at a geographically distant location from modules 510, 530, and 540.

I/O interface 530 of the system environment shown in FIG. 5 may be implemented with a wide variety of devices to receive and/or provide the data to and from Network Portal 270. I/O interface 530 may include an input device, a storage device, and/or a network. The input device may include a keyboard, a mouse, a disk drive, video camera, magnetic card reader, or any other suitable input device for providing records to Network Portal 270.

Network interface 540 may be connected to a network, such as a Wide Area Network, a Local Area Network, or the Internet for providing read/write access to records.

Memory device 550 may be implemented with various forms of memory or storage devices, such as read-only memory (ROM) devices and random access memory (RAM) devices. Memory device 550 may also include a memory tape or disk drive for reading and providing records on a storage tape or disk as input to Network Portal 270. Memory device 550 may comprise an Operating System 552; a TCP/IP Module or stack 554, an HTTP interface 556 for serving web pages, an FTP module 558 for permitting file transfers, and Child Track[SM] server interface 560 for interfacing to Child Track[SM] server 210

Figure 6:
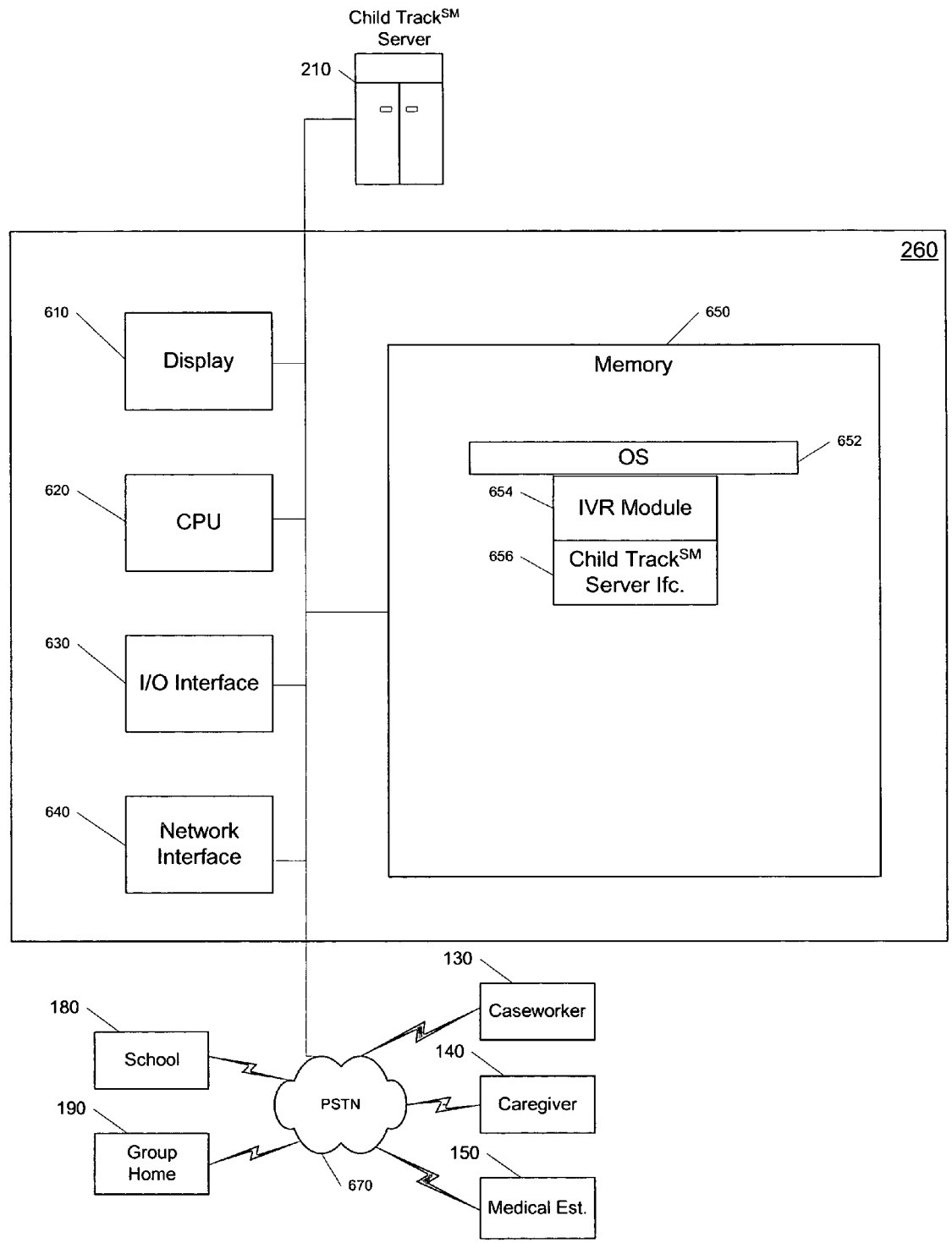
FIG. 6 is a system embodiment of an interactive voice response (IVR) system consistent with an exemplary embodiment consistent with the present invention.

FIG. 6 is a block diagram of an Interactive Voice Response system 260 consistent with the present invention. As illustrated in FIG. 6, an IVR System 260 may include a display 610, a central processing unit 620, an input/output interface 630, a network interface 640 and memory 650 coupled together by a bus. IVR System 260 is adapted to include the necessary functionality and computing capabilities to interface Child Track[SM] system, specifically Child Track[SM] server 210, with school systems 180, group homes 190, caseworkers 130, caregivers 140, and medical establishments 150 via PSTN 670 to permit the updating and retrieval of records, such as child records and caregiver records. The input, output, and monitoring of the system may be provided on display 610 for viewing.

In the embodiment of FIG. 6, IVR System 260 may comprise a PC or mainframe computer for performing various functions and operations of the invention. IVR System 260 may be implemented, for example, by a general purpose computer selectively activated or reconfigured by a computer program stored in the computer, or may be a specially constructed computing platform for carrying-out the features and operations of the present invention. IVR System 260 may also be implemented or provided with a wide variety of components or subsystems including, for example, one or more of the following: one or more central processing units 620, a co-processor, memory 650, registers, and other data processing devices and subsystems. IVR System 260 also communicates or transfers caregiver records and child records via I/O interface 630 and/or network interface 640 through the use of direct connections or communication links to other elements of Child Track[SM] system, for example caseworker systems 130 and caregiver 140. In an exemplary embodiment of the invention, a firewall in, for example, network interface 640, prevents access to the platform by unpermitted outside sources.

Alternatively, communication between IVR System 260 and modules 610, 630, and 640 can be achieved through the use of a network architecture (not shown). In the alternative embodiment (not shown), the network architecture may comprise, alone or in any suitable combination, a telephone-based network (such as a PBX or POTS), a local area network (LAN), a wide area network (WAN), a dedicated intranet, and/or the Internet. Further, it may comprise any suitable combination of wired and/or wireless components and systems. By using dedicated communication links or shared network architecture, IVR System 260 may be located in the same location or at a geographically distant location from modules 610, 630, and 640.

I/O interface 630 of the system environment shown in FIG. 6 may be implemented with a wide variety of devices to receive and/or provide the data to and from IVR System 260. I/O interface 630 may include an input device, a storage device, and/or a network. The input device may include a keyboard, a mouse, a disk drive, video camera, magnetic card reader, or any other suitable input device for providing records to IVR System 260.

Network interface 640 may be connected to a network, such as a Wide Area Network, a Local Area Network, or the Internet for providing read/write access to records.

Memory device 650 may be implemented with various forms of memory or storage devices, such as read-only memory (ROM) devices and random access memory (RAM) devices. Memory device 650 may also include a memory tape or disk drive for reading and providing records on a storage tape or disk as input to IVR System 260. Memory device 650 may comprise an Operating System 652; and IVR module 654 for providing interactive voice and touchtone responses to retrieve, record, or update records; and a Child Track[SM] server interface 656 for interfacing to Child Track[SM] server 210.

Figure 7:
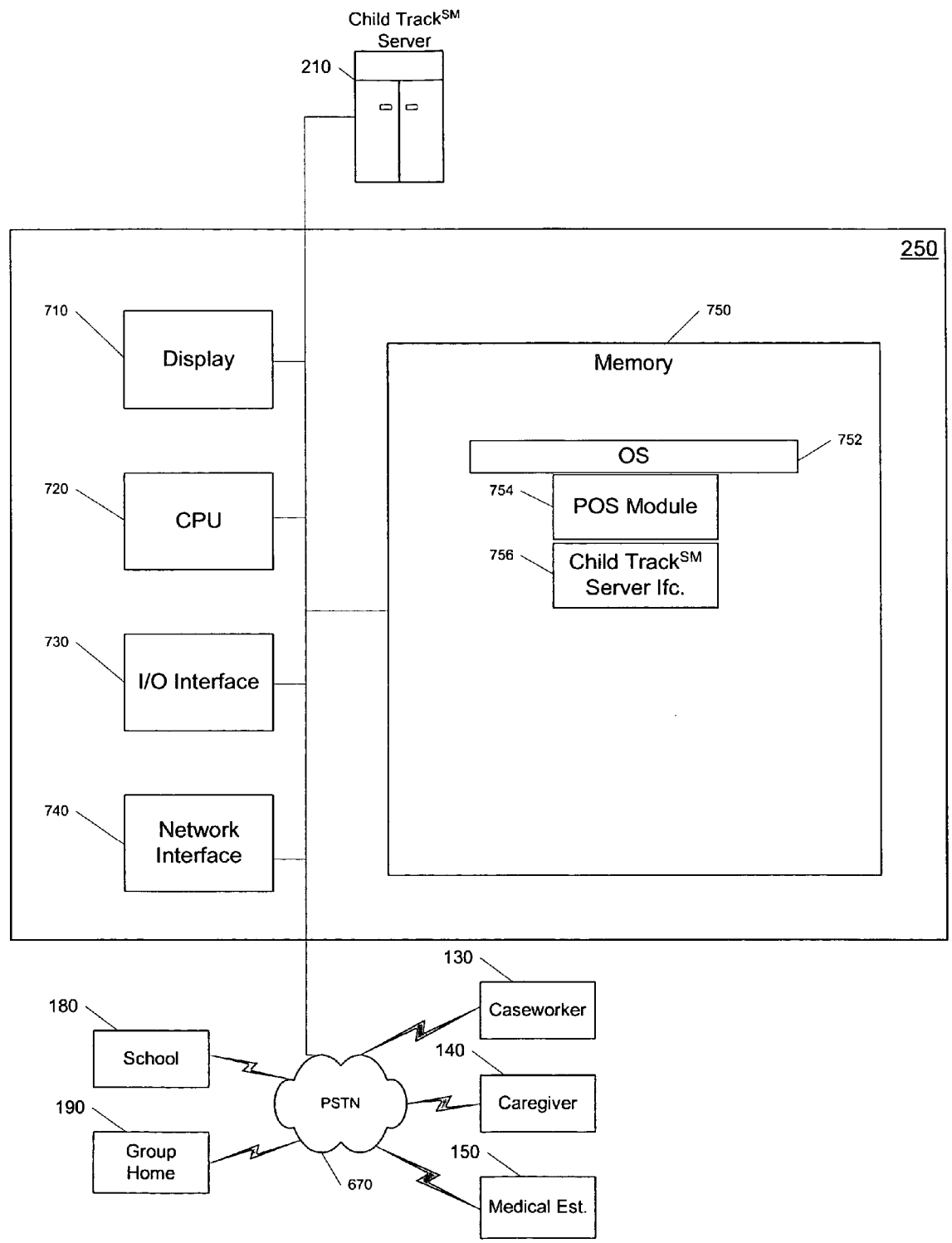
FIG. 7 is a system embodiment of a point of sale (POS) system consistent with an exemplary embodiment consistent with the present invention.

FIG. 7 is a block diagram of a Point of Sale system consistent with the present invention. As illustrated in FIG. 7, a POS Interface 250 may include a display 710, a central processing unit 720, an input/output interface 730, a network interface 740 and memory 750 coupled together by a bus. POS Interface 250 is adapted to include the necessary functionality and computing capabilities to interface Child Track[SM] system, specifically Child Track[SM] server 210, with school systems 180, group homes 190, caseworkers 130, caregivers 140, and medical establishments 150 via PSTN 670 to permit the updating and retrieval of records, such as child records and caregiver records. The input, output, and monitoring of the system may be provided on display 710 for viewing.

In the embodiment of FIG. 7, POS Interface 250 may comprise a PC or mainframe computer for performing various functions and operations of the invention. POS Interface 250 may be implemented, for example, by a general purpose computer selectively activated or reconfigured by a computer program stored in the computer, or may be a specially constructed computing platform for carrying-out the features and operations of the present invention. POS Interface 250 may also be implemented or provided with a wide variety of components or subsystems including, for example, one or more of the following: one or more central processing units 720, a co-processor, memory 750, registers, and other data processing devices and subsystems. POS Interface 250 also communicates or transfers caregiver records and child records via I/O interface 730 and/or network interface 740 through the use of direct connections or communication links to other elements of Child Track$^{SM}$ system, for example caseworker systems 130 and caregiver 140. In an exemplary embodiment of the invention, a firewall in, for example, network interface 740, prevents access to the platform by unpermitted outside sources.

Alternatively, communication between POS Interface 250 and modules 710, 730, and 740 can be achieved through the use of a network architecture (not shown). In the alternative embodiment (not shown), the network architecture may comprise, alone or in any suitable combination, a telephone-based network (such as a PBX or POTS), a local area network (LAN), a wide area network (WAN), a dedicated intranet, and/or the Internet. Further, it may comprise any suitable combination of wired and/or wireless components and systems. By using dedicated communication links or shared network architecture, POS Interface 250 may be located in the same location or at a geographically distant location from modules 710, 730, and 740.

I/O interface 730 of the system environment shown in FIG. 7 may be implemented with a wide variety of devices to receive and/or provide the data to and from POS Interface 250. I/O interface 730 may include an input device, a storage device, and/or a network. The input device may include a keyboard, a mouse, a disk drive, video camera, magnetic card reader, or any other suitable input device for providing records to POS Interface 250.

Network interface 740 may be connected to a network, such as a Wide Area Network, a Local Area Network, or the Internet for providing read/write access to records.

Memory device 750 may be implemented with various forms of memory or storage devices, such as read-only memory (ROM) devices and random access memory (RAM) devices. Memory device 750 may also include a memory tape or disk drive for reading and providing records on a storage tape or disk as input to POS Interface 250. Memory device 750 may comprise an Operating System 752; a POS module 754 for providing an interface to POS terminals in order to retrieve, record, or update records; and a Child Track$^{SM}$ server interface 756 for interfacing to Child Track$^{SM}$ server 210.

Figure 8:
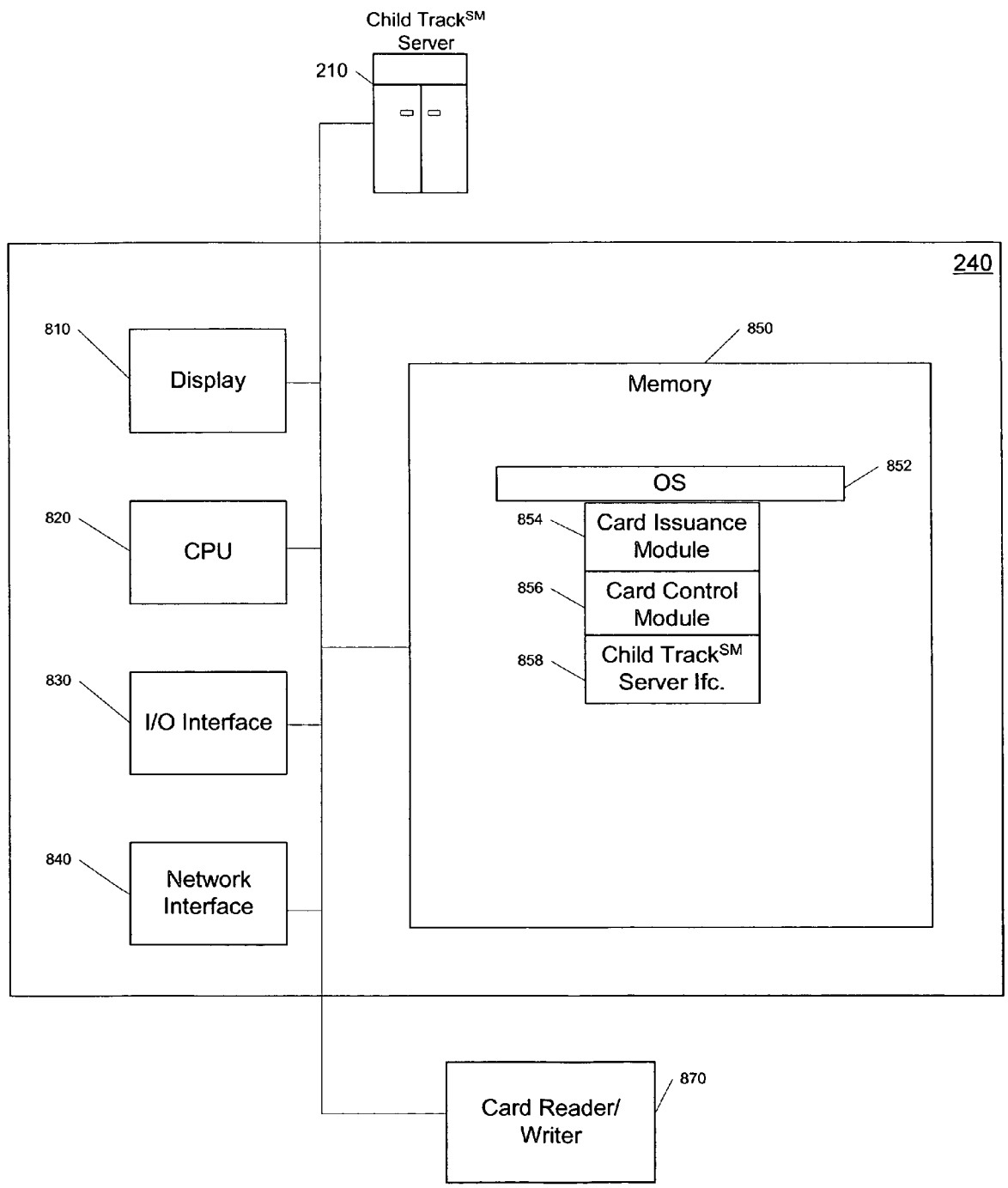
FIG. 8 is a system embodiment of a card control system consistent with an exemplary embodiment consistent with the present invention.

FIG. 8 is a block diagram of a card control system consistent with the present invention. As illustrated in FIG. 8 a Card Control 240 may include a display 810, a central processing unit 820, an input/output interface 830, a network interface 840 and memory 850 coupled together by a bus. Card Control 240 is adapted to include the necessary functionality and computing capabilities to create and control Child Track$^{SM}$ cards, as previously described. The input, output, and monitoring of the system may be provided on display 810 for viewing.

In the embodiment of FIG. 8, Card Control 240 may comprise a PC or mainframe computer for performing various functions and operations of the invention. Card Control 240 may be implemented, for example, by a general purpose computer selectively activated or reconfigured by a computer program stored in the computer, or may be a specially constructed computing platform for carrying-out the features and operations of the present invention. Card Control 240 may also be implemented or provided with a wide variety of components or subsystems including, for example, one or more of the following: one or more central processing units 820, a co-processor, memory 850, registers, and other data processing devices and subsystems. Card Control 240 also communicates or transfers caregiver records and child records via I/O interface 830 and/or network interface 840 through the use of direct connections or communication links to other elements of Child Track$^{SM}$ system, for example caseworker systems 130 and caregiver 140. In an exemplary embodiment of the invention, a firewall in, for example, network interface 840, prevents access to the platform by unpermitted outside sources.

Alternatively, communication between Card Control 240 and modules 810, 830, and 840 can be achieved through the use of a network architecture (not shown). In the alternative embodiment (not shown), the network architecture may comprise, alone or in any suitable combination, a telephone-based network (such as a PBX or POTS), a local area network (LAN), a wide area network (WAN), a dedicated intranet, and/or the Internet. Further, it may comprise any suitable combination of wired and/or wireless components and systems. By using dedicated communication links or shared network architecture, Card Control 240 may be located in the same location or at a geographically distant location from modules 810, 830, and 840.

I/O interface 830 of the system environment shown in FIG. 8 may be implemented with a wide variety of devices to receive and/or provide the data to and from Card Control 240. I/O interface 830 may include an input device, a storage device, and/or a network. The input device may include a keyboard, a mouse, a disk drive, video camera, magnetic card reader, or any other suitable input device for providing records to Card Control 240.

Network interface 840 may be connected to a network, such as a Wide Area Network, a Local Area Network, or the Internet for providing read/write access to records.

Memory device 850 may be implemented with various forms of memory or storage devices, such as read-only memory (ROM) devices and random access memory (RAM) devices. Memory device 850 may also include a memory tape or disk drive for reading and providing records on a storage tape or disk as input to and output from Card Control 240. Memory device 850 may store card information associated with each child. Memory device 850 may comprise an Operating System 852; a Card Issuance module 854 for issuing cards associated with each child, for example, upon command of Child Track$^{SM}$ server 210; a card control module 856 for updating and maintaining card information; and a Child Track$^{SM}$ server interface 858 for interfacing to Child Track$^{SM}$ server 210.

Figure 9:
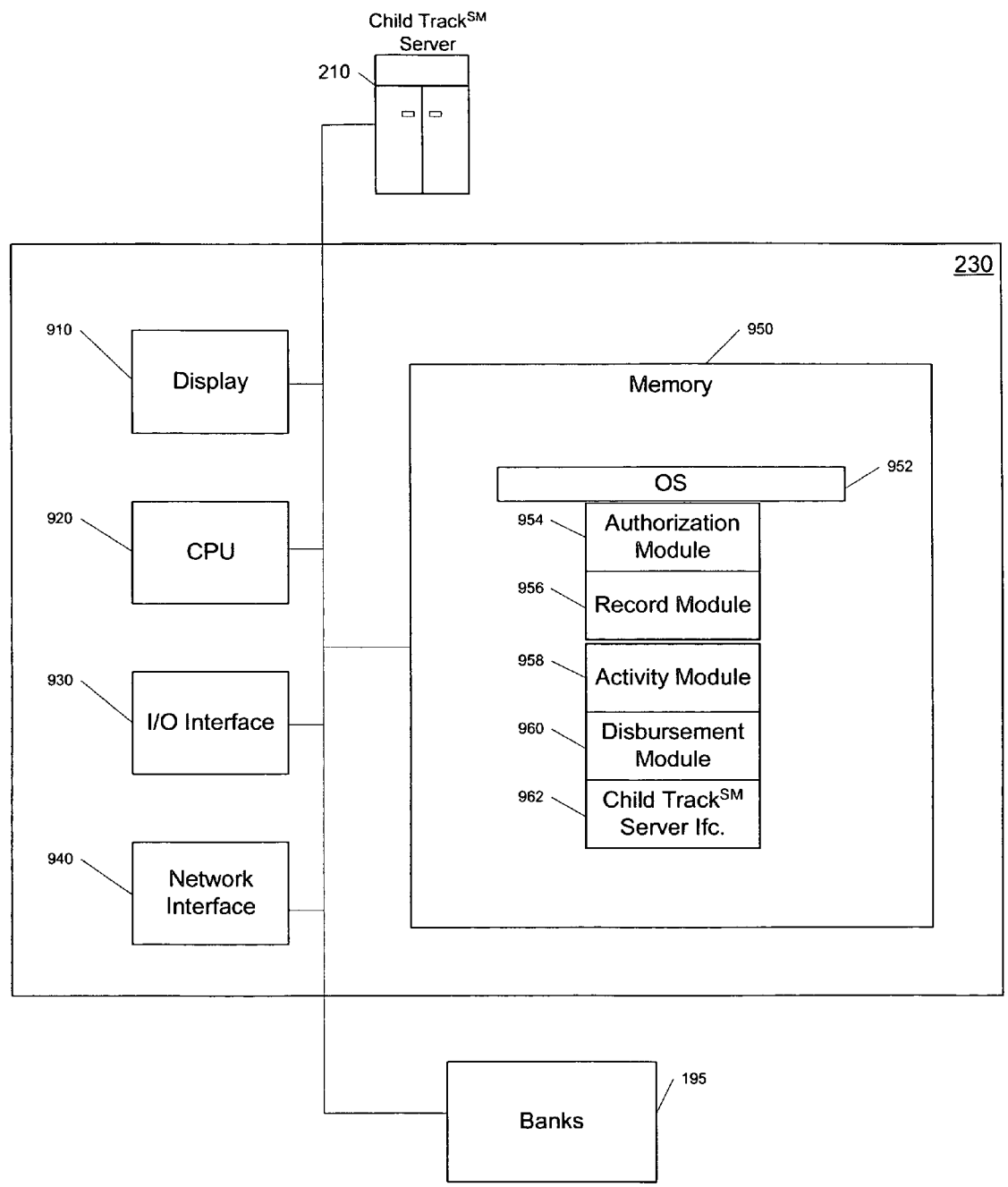
FIG. 9 is a system embodiment of a payment processing host consistent with an exemplary embodiment consistent with the present invention.

FIG. 9 is a block diagram of payment processing host 230 consistent with the present invention. As illustrated in FIG. 9, a payment processing host 230 may include a display 910, a central processing unit 920, an input/output interface 930, a network interface 940 and memory 950 coupled together by a bus. Payment processing host 230 is adapted to include the necessary functionality and computing capabilities to authorize and track payments and disbursements via financial institutions 195. The input, output, and monitoring of the system may be provided on display 910 for viewing.

In the embodiment of FIG. 9, Payment processing host 230 may comprise a PC or mainframe computer for performing various functions and operations of the invention. Payment processing host 230 may be implemented, for example, by a general purpose computer selectively activated or reconfigured by a computer program stored in the computer, or may be a specially constructed computing platform for carrying-out the features and operations of the present invention. Payment processing host 230 may also be implemented or provided with a wide variety of components or subsystems including, for example, one or more of the following: one or more central processing units 920, a co-processor, memory 950, registers, and other data processing devices and subsystems. Payment processing host 230 also communicates or transfers caregiver records and child records via I/O interface 930 and/or network interface 940 through the use of direct connections or communication links to other elements of Child Track$^{SM}$ system, for example caseworker systems 130 and caregiver 140. In an exemplary embodiment of the invention, a firewall in, for example, network interface 940, prevents access to the platform by unpermitted outside sources.

Alternatively, communication between Payment processing host 230 and modules 910, 930, and 940 can be achieved through the use of a network architecture (not shown). In the alternative embodiment (not shown), the network architecture may comprise, alone or in any suitable combination, a telephone-based network (such as a PBX or POTS), a local area network (LAN), a wide area network (WAN), a dedicated intranet, and/or the Internet. Further, it may comprise any suitable combination of wired and/or wireless components and systems. By using dedicated communication links or shared network architecture, Payment processing host 230 may be located in the same location or at a geographically distant location from modules 910, 930, and 940.

I/O interface 930 of the system environment shown in FIG. 9 may be implemented with a wide variety of devices to receive and/or provide the data to and from Payment processing host 230. I/O interface 930 may include an input device, a storage device, and/or a network. The input device may include a keyboard, a mouse, a disk drive, video camera, magnetic card reader, or any other suitable input device for providing records to Payment processing host 230.

Network interface 940 may be connected to a network, such as a Wide Area Network, a Local Area Network, or the Internet for providing read/write access to records.

Memory device 950 may be implemented with various forms of memory or storage devices, such as read-only memory (ROM) devices and random access memory (RAM) devices. Memory device 950 may also include a memory tape or disk drive for reading and providing records on a storage tape or disk as input to and output from Payment processing host 230. Memory device 950 may comprise an Operating System 952; an authorization module 954 for authorizing payments; a record module 956 for recording payments; an activity module 958 for recording financial transactions; a disbursement module 960 for recording disbursements; and a Child Track$^{SM}$ server interface 962 for interfacing to Child Track$^{SM}$ server 210.

FIGS. 10-20 are flowcharts providing more detail on exemplary child tracking processes, which the modules described above, or other modules, can carry out. Each flowchart shows a piece of the overall operation of Child Track$^{SM}$ system where multiple events, or instances of child update information, are uploaded to Child Track$^{SM}$ server for storage and later recall and reporting. Those skilled in the art will appreciate that the process flows may be implemented in a variety of fashions. Although these flowcharts illustrate most features of the processes, they may, for purposes of clarity, omit some features in the following text.

Figure 10:
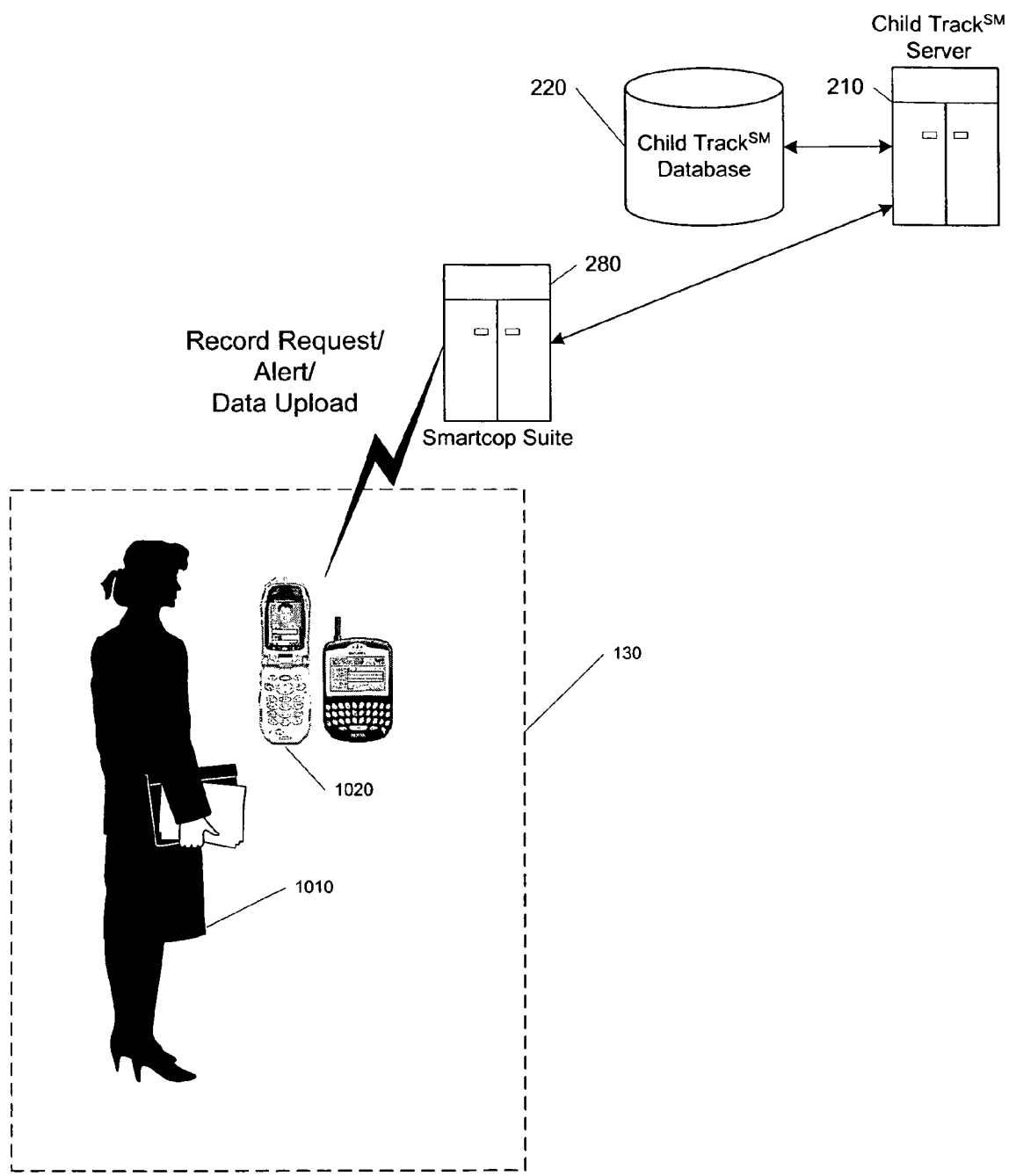
FIG. 10 is a flow diagram of a mobile platform interface session between Child Track$^{SM}$ system and a caseworker system consistent with an exemplary embodiment consistent with the present invention.

FIG. 10 is a flow diagram of a mobile platform interface session between Child Track$^{SM}$ system 110 and a caseworker system 130 consistent with the present invention. In this exemplary data flow, a caseworker 1010 utilizing a mobile platform 1020, such as a data enabled mobile telephone, PDA with wireless features, or a RIM pager, may provide child update information to Child Track$^{SM}$ server 210, may request child or caregiver records from Child Track$^{SM}$ server 210, or may receive a child alert from Child Track$^{SM}$ server 210.

A caseworker 1010 that desires to enter child update information utilizes mobile platform 1020 to communicate via a mobile platform interface application, for example mobile platform interface application 280, with Child Track$^{SM}$ server 210. The caseworker 1010 may enter the case identification number from the child's Child Track$^{SM}$ card, the caseworkers PIN, GPS location and child status information into the mobile platform 1020. The mobile platform 1020 may provide this child update information to Child Track$^{SM}$ server 210 for storage on Child Track$^{SM}$ database 220. In this fashion, the caseworker 1010 has an easy, mobile means to enter child update information. Similarly, a caregiver, medical establishment, school, or law enforcement (not shown) may utilize these same tools to enter child update information into Child Track$^{SM}$ server.

Likewise, the caseworker can request child record information or caregiver information from Child Track$^{SM}$ server 210 by issuing a request to Child Track$^{SM}$ server 210 utilizing mobile platform 1020 interfaced through mobile platform interface application 280. The requested information record is returned through the system to the caseworker via mobile platform interface application 280. Similarly, a caregiver, medical establishment, school, or law enforcement (not shown) may utilize these same tools to request caregiver and child records from Child Track$^{SM}$ server.

In addition, child alerts generated by Child Track$^{SM}$ server 210, for example when a child update information record is not presented to Child Track$^{SM}$ server 210 by the caregiver in a timely fashion, may be sent to the mobile platform 1020 of a caseworker or other authority.

Figure 11:
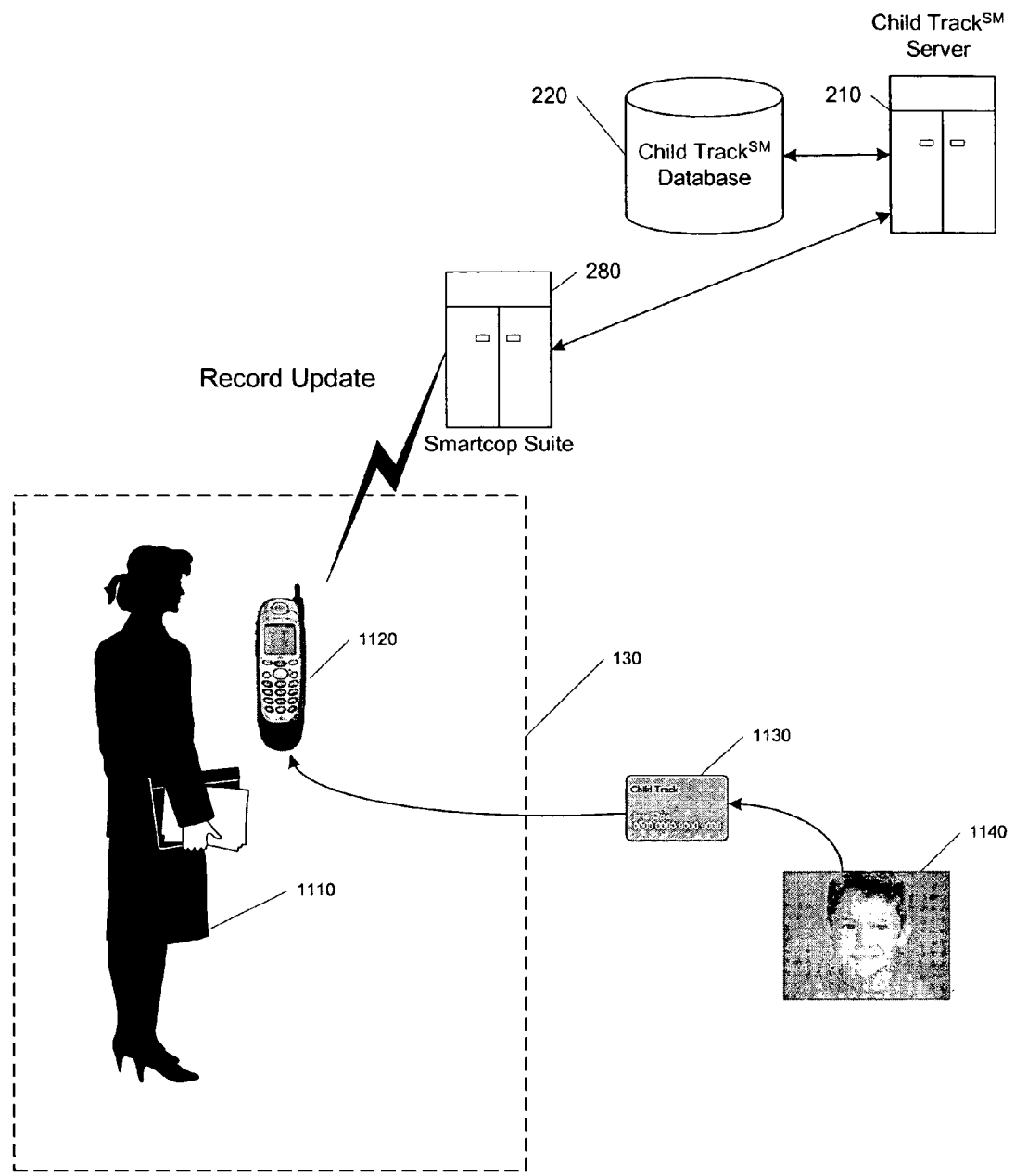
FIG. 11 is a flow diagram of a scanner enabled mobile platform interface session between Child Track$^{SM}$ system and a caseworker system 130 consistent with an exemplary embodiment consistent with the present invention.

FIG. 11 is a flow diagram of a scanner-equipped mobile platform interface session between Child Track$^{SM}$ system 110 and a caseworker system 130 consistent with the present invention. In this exemplary data flow, a caseworker 1110 utilizing a scanner-equipped mobile platform 1120 may provide child update information to Child Track$^{SM}$ server 210 partially by scanning a card 1130 of a child 1140 through the mobile platform 1120, may request child or caregiver records from Child Track$^{SM}$ server 210, or may receive a child alert from Child Track$^{SM}$ server 210.

A caseworker 1110 that desires to enter child update information utilizes mobile platform 1120 to communicate via mobile platform interface application 280 with Child Track$^{SM}$ server 210. The caseworker 1110 may scan the case identification number from the child's Child Track$^{SM}$ card, the caseworker's PIN, GPS location, and child status information into the mobile platform 1120. The mobile platform 1120 may provide this child update information to Child Track$^{SM}$ server 210 for storage on Child Track$^{SM}$ database 220. In this fashion, the caseworker 1110 has an easy, mobile means to enter child update information. Similarly, a caregiver, medical establishment, school, or law enforcement (not shown) may utilize these same tools to enter child update information into Child Track$^{SM}$ server.

Likewise, the caseworker can request child record information or caregiver information from Child Track$^{SM}$ server 210 by issuing a request to Child Track$^{SM}$ server 210 utilizing mobile platform 1120 interfaced through mobile platform interface application 280. The requested information record is returned through the system to the caseworker via mobile platform interface application 280. Similarly, a caregiver, medical establishment, school, or law enforcement (not shown) may utilize these same tools to request caregiver and child records from Child Track$^{SM}$ server.

In addition, child alerts generated by Child Track$^{SM}$ server 210, for example when a child update information record is not presented to Child Track$^{SM}$ server 210 by the caregiver in a timely fashion, may be sent to the mobile platform 1120 of a caseworker or other authority.

Figure 12:
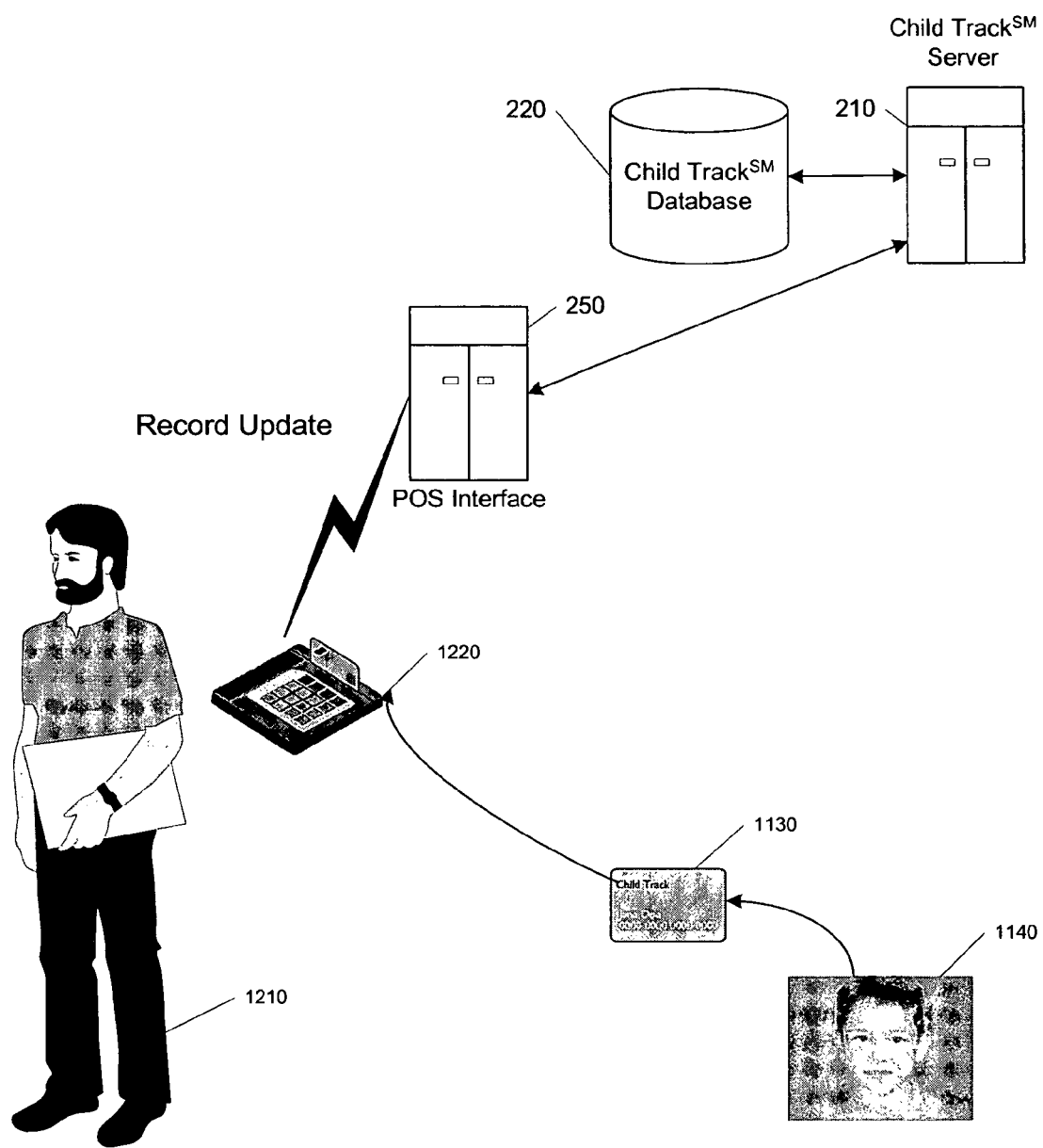
FIG. 12 is a flow diagram of a POS system session within Child Track^SM system consistent with an exemplary embodiment consistent with the present invention.

FIG. 12 is a flow diagram of a POS interface session between Child Track$^{SM}$ system 110 and a caregiver system 1210 consistent with the present invention. In this exemplary data flow, a caregiver 1210 utilizing a POS terminal 1220 may provide child update information to Child Track$^{SM}$ server 210 partially by scanning a child's 1140 card 1130 through POS terminal 1220 and may request child or caregiver records from Child Track$^{SM}$ server 210.

A caregiver 1210 that desires to enter child update information utilizes POS terminal 1220 to communicate via POS Interface 250 with Child Track$^{SM}$ server 210. Caregiver 1210 may scan the case identification number from the child's Child Track$^{SM}$ card and enters child status information into the POS terminal 1220. The POS terminal 1220 will provide this child update information, possibly including POS terminal identifier, to Child Track$^{SM}$ server 210 for storage on Child Track$^{SM}$ database 220. In this fashion, Caregiver 1210 has an easy means to enter child update information. Similarly, a caseworker, medical establishment, school, or law enforcement (not shown) may utilize these same tools to enter child update information into Child Track$^{SM}$ server.

Likewise, Caregiver 1210 can request child record information or caregiver information from Child Track$^{SM}$ server 210 by issuing a request to Child Track$^{SM}$ server 210 utilizing POS terminal 1220 interfaced through POS Interface 250. The requested information record is returned through the system to the caregiver via POS Interface 250. Similarly, a caseworker, medical establishment, school, or law enforcement (not shown) may utilize these same tools to request caregiver and child records from Child Track$^{SM}$ server 210.

Figure 13:
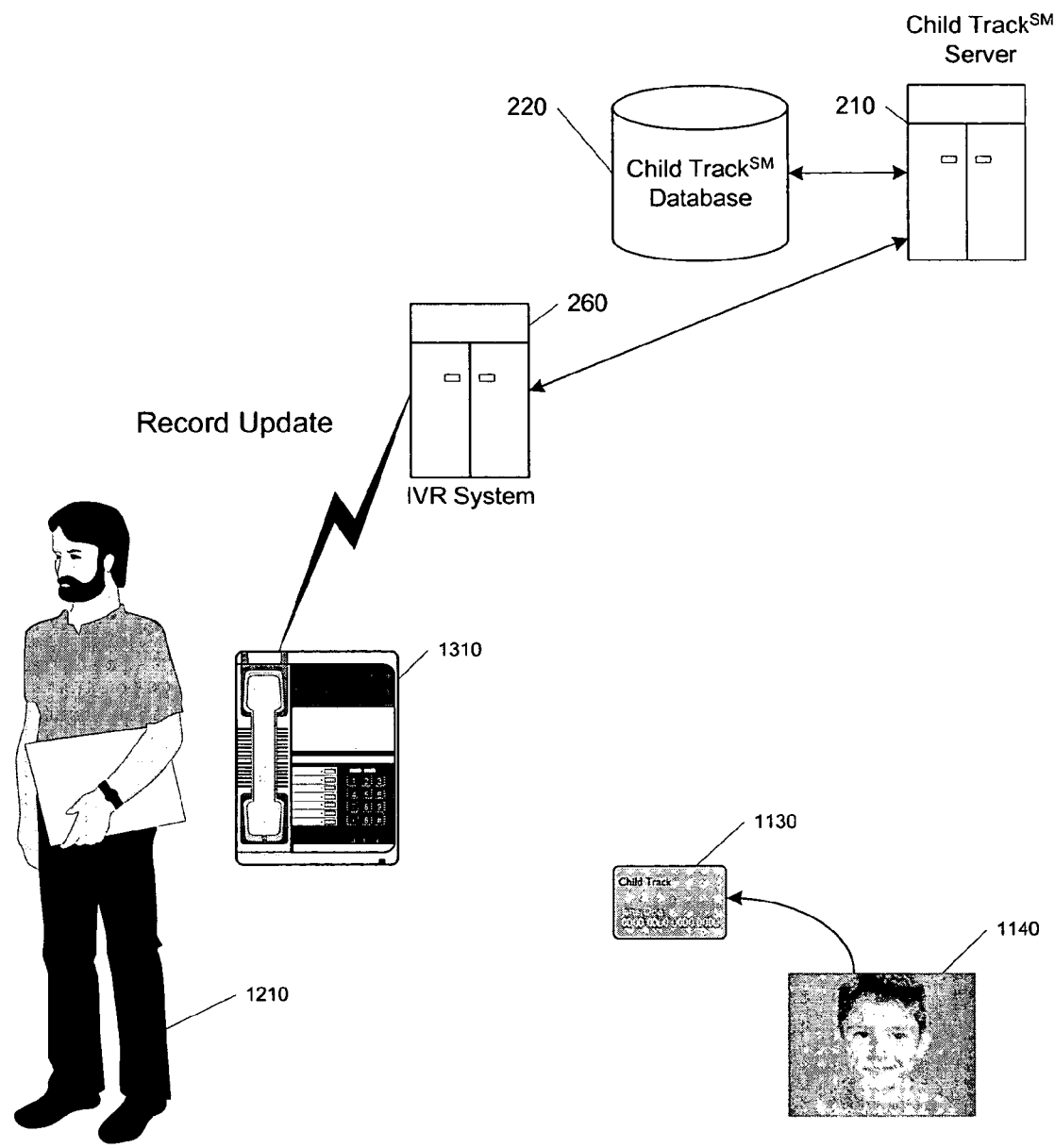
FIG. 13 is a flow diagram of an IVR session within Child Track^SM system consistent with an exemplary embodiment consistent with the present invention.

FIG. 13 is a flow diagram of an IVR session between Child Track$^{SM}$ system 110 and a caregiver 1210 consistent with the present invention. In this exemplary data flow, a caregiver 1210 utilizing a telephone 1310 may provide child update information to Child Track$^{SM}$ server 210 and may request child or caregiver records from Child Track$^{SM}$ server 210.

A caregiver 1210 that desires to enter child update information utilizes telephone 1310 to communicate via IVR System 260 with Child Track$^{SM}$ server 210. Caregiver 1210 may input the case identification number from the child's Child Track$^{SM}$ card and enters child status information into the telephone 1310 using touch-tones or voice commands. The telephone 1310 will provide this child update information, possibly including Caller Identification, to Child Track$^{SM}$ server 210 for storage on Child Track$^{SM}$ database 220. In this fashion, Caregiver 1210 has an easy means to enter child update information. Similarly, a caseworker, medical establishment, school, or law enforcement (not shown) may utilize these same tools to enter child update information into Child Track$^{SM}$ server.

Likewise, caregiver 1210 can request child record information or caregiver information from Child Track$^{SM}$ server 210 by issuing a request to Child Track$^{SM}$ server 210 utilizing telephone 1310 interfaced through IVR System 260. The requested information record is returned through the system to the caregiver via IVR System 260. Similarly, a caseworker, medical establishment, school, or law enforcement (not shown) may utilize these same tools to request caregiver and child records from Child Track$^{SM}$ server 210.

Figure 14:
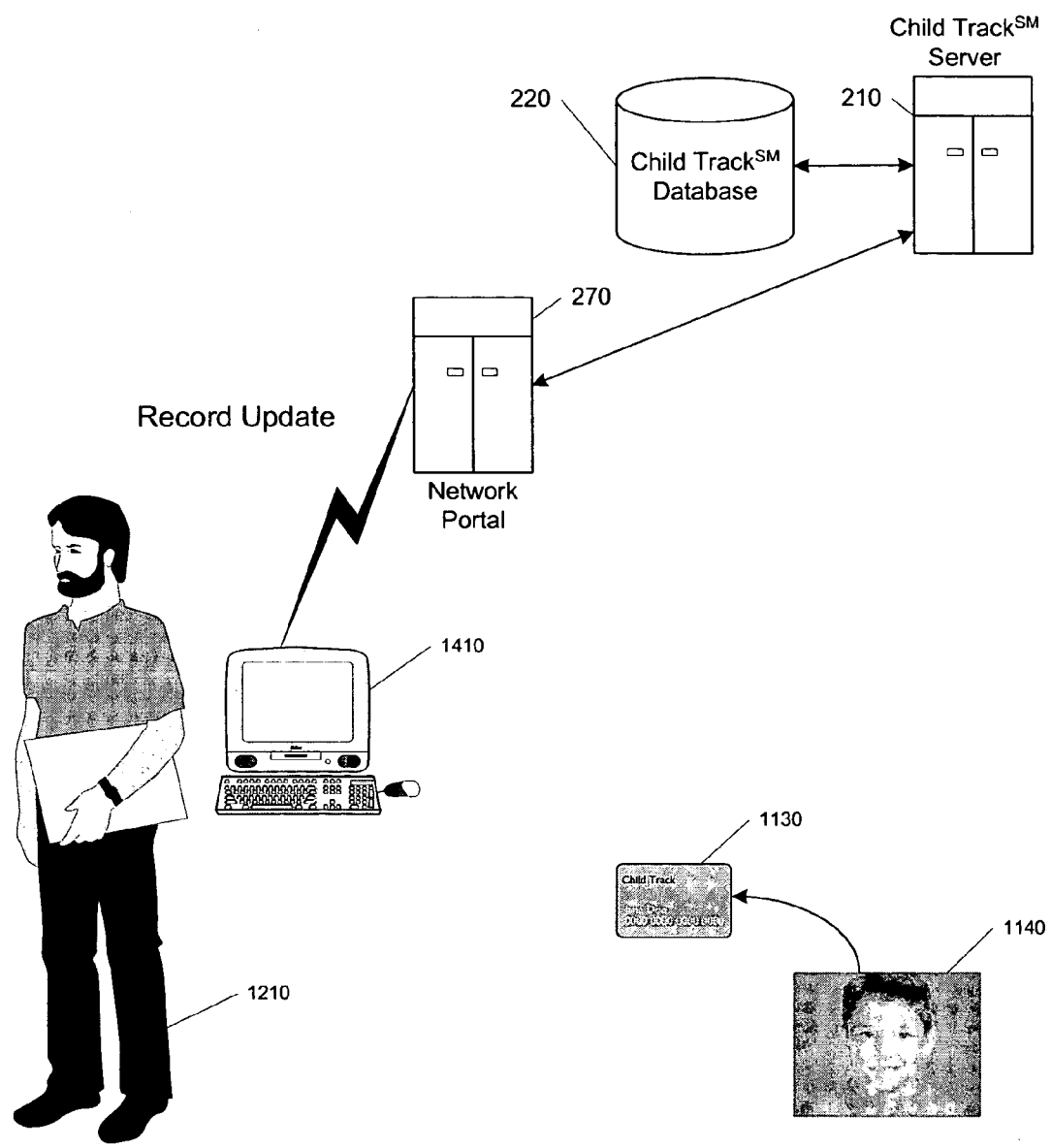
FIG. 14 is a flow diagram of a network platform interface session within Child Track^SM system consistent with an exemplary embodiment consistent with the present invention.

FIG. 14 is a flow diagram of a network platform interface session between Child Track$^{SM}$ system 110 and a caregiver 1210 consistent with the present invention. In this exemplary data flow, a caregiver 1210 utilizing a network terminal 1410 may provide child update information to Child Track$^{SM}$ server 210 and may request child or caregiver records from Child Track$^{SM}$ server 210. The network terminal 1410 may be, for example, a PC running a web browser.

A caregiver 1210 that desires to enter child update information utilizes network terminal 1410 to communicate via Network Portal 270 with Child Track$^{SM}$ server 210. Caregiver 1210 may input the case identification number from the child's Child Track$^{SM}$ card and enters child status information into the network terminal 1410. The network terminal 1410 will provide this child update information, possibly including the network address (e.g., the IP address), to Child Track$^{SM}$ server 210 for storage on Child Track$^{SM}$ database 220. In this fashion, Caregiver 1210 has an easy means to enter child update information. Similarly, a caseworker, medical establishment, school, or law enforcement (not shown) may utilize these same tools to enter child update information into Child Track$^{SM}$ server.

Likewise, Caregiver 1210 can request child record information or caregiver information from Child Track$^{SM}$ server 210 by issuing a request to Child Track$^{SM}$ server 210 utilizing network terminal 1410 interfaced through Network Portal 270. The requested information record is returned through the system to Caregiver via Network Portal 270. Similarly, a caseworker, medical establishment, school, or law enforcement (not shown) may utilize these same tools to request caregiver and child records from Child Track$^{SM}$ server 210.

Figure 15:
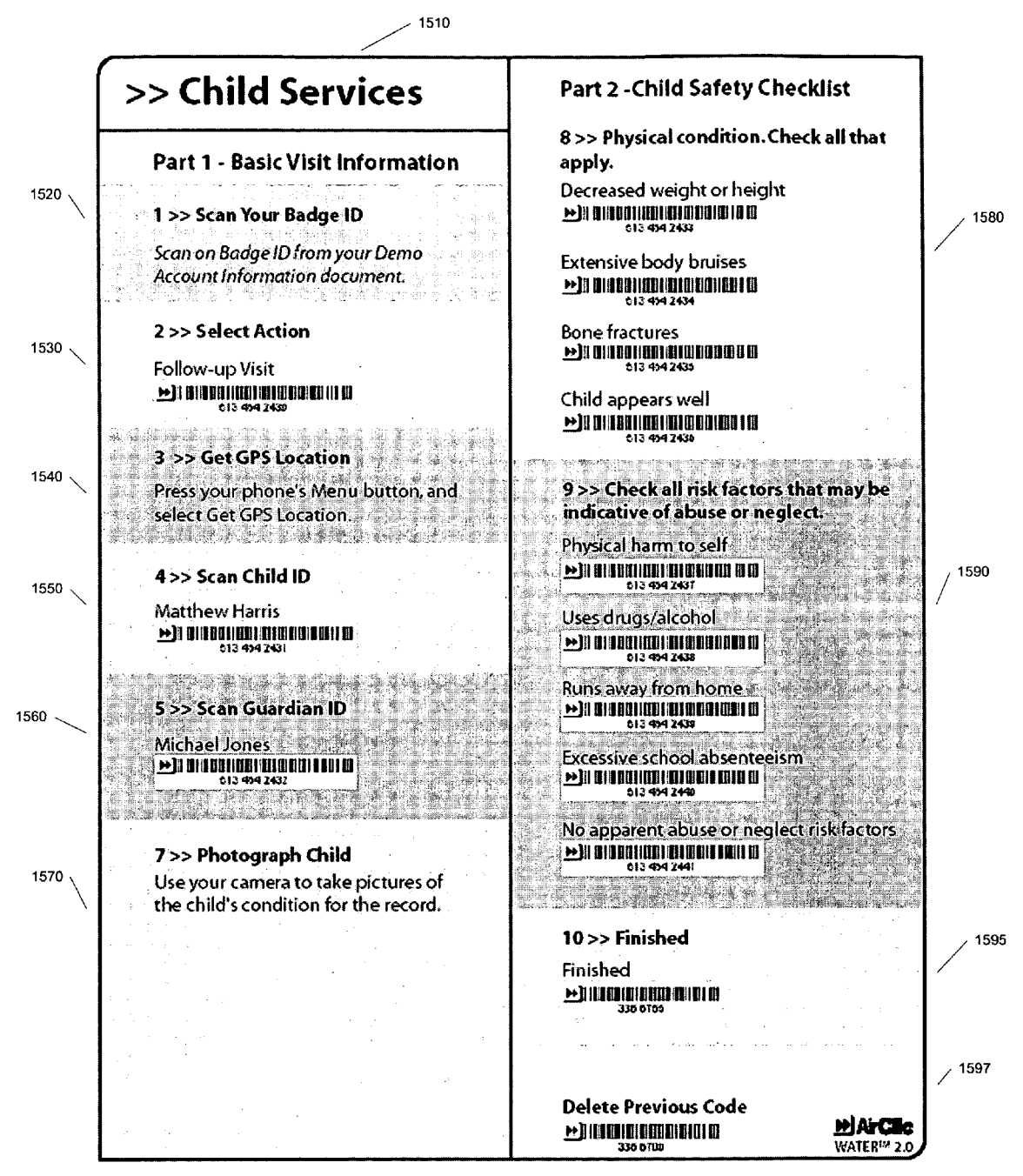

FIG. 15 illustrates an exemplary scannable child services card 1510 consistent with the present invention. A reporter, i.e. a caseworker or caregiver, may utilize a terminal having scanner capabilities, such as a scanner-equipped mobile telephone, scanner-equipped computer, or scanner-equipped PDA. The reporter may then utilize card 1510 to facilitate the rapid entry of information. An exemplary child services card 1510 contains a plurality of fields and options. At 1520, card 1510 instructs the reporter to scan her badge ID, or PIN. At 1530, card 1510 instructs the reporter to scan an action, for example a follow-up visit. Action field 1530 may contain a plurality of action options from which the reporter may choose.

At GPS field 1540, the reporter is prompted to retrieve her GPS location from the cell phone or enter it into the system through another means. At Child Track$^{SM}$ field 1550, the reporter is prompted to scan the child's Child Track$^{SM}$ card. At guardian field 1560, the reporter is prompted to scan Caregiver or group home's identification. At photograph field 1570, the reporter is prompted to take a photograph of the child with, for example, the reporter's scanner-equipped mobile platform. At physical condition field 1580, the reporter is prompted to select and scan a physical condition code for the child. At risk factor field 1590, the reporter is prompted to scan one or more risk factor codes if appropriate. Finally, completion field 1595 may be scanned to signal to the system that this child update is complete. This card layout is an exemplary one, and those skilled in the art will appreciate that multiple cards may be used with a variety of fields and options.

Figure 16:
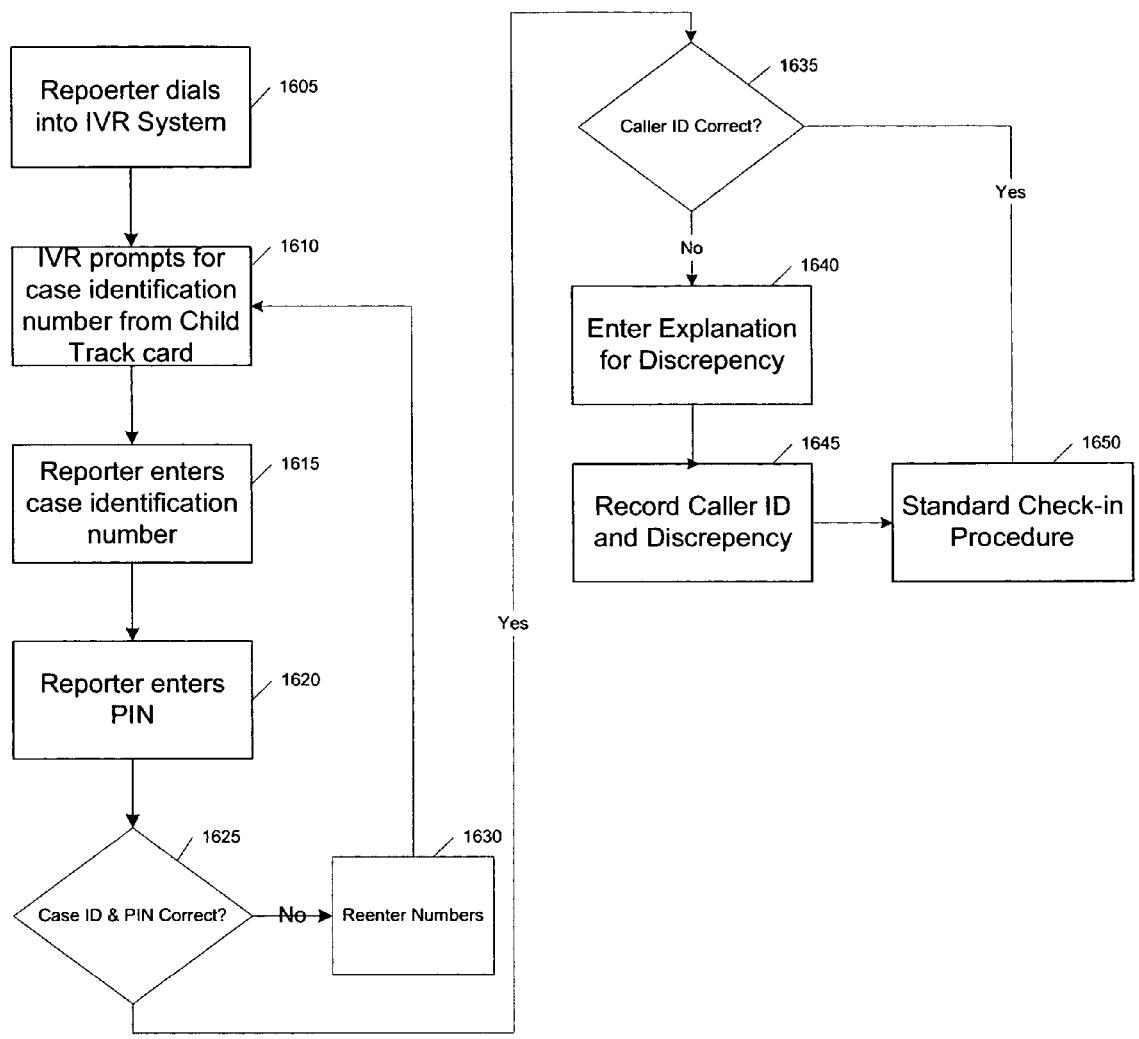
FIG. 16 is a flow chart of IVR child update information process in an exemplary embodiment consistent with the present invention.

FIG. 16 is a flow chart of an IVR child update information process consistent with the present invention. Generally, this process will be used by a caregiver to provide child update information to the childcare system. In this fashion, the child welfare system may keep tabs on the whereabouts and status of both children and caregivers. Of course, IVR child update information process can be used by any stakeholder to provide child update information to Child Track$^{SM}$ system. At stage 1605, IVR system receives a call the reporter, for example the caseworker or Caregiver. At stage 1610, IVR system may prompt the caller for the case identification number unique to the child of interest, where the case identification number is printed or encoded on the child's Child Track$^{SM}$ card. At stage 1615, the reporter may enter the case identification number into the telephone for transmission to IVR system. At stage 1620, the reporter enters his Personal Identification Number (PIN), so that IVR system will know the identity of the reporter. At stage 1625, IVR system may verify that the case identification number and PIN are accurate, requesting the reentry of numbers at stage 1630 if there is an error.

Should the case identification number and PIN be correct, at stage 1635, IVR system may verify that the Caller ID is correct. In other words, for each child there may be one or more associated telephone Caller ID's associated with the child's caregiver. At stage 1640, if there is a discrepancy between the stored Caller ID and the Caller ID identified by IVR system, this may indicate that the child update information is not being provided from an authorized caregiver telephone. Therefore, the reporter is requested to enter, possibly from a menu of choices, an explanation for the discrepancy. At stage 1645, the actual, received Caller ID is recorded along with the reason for the discrepancy in the child record.

At stage 1650, the standard check-in procedure is initiated.

Figure 17:
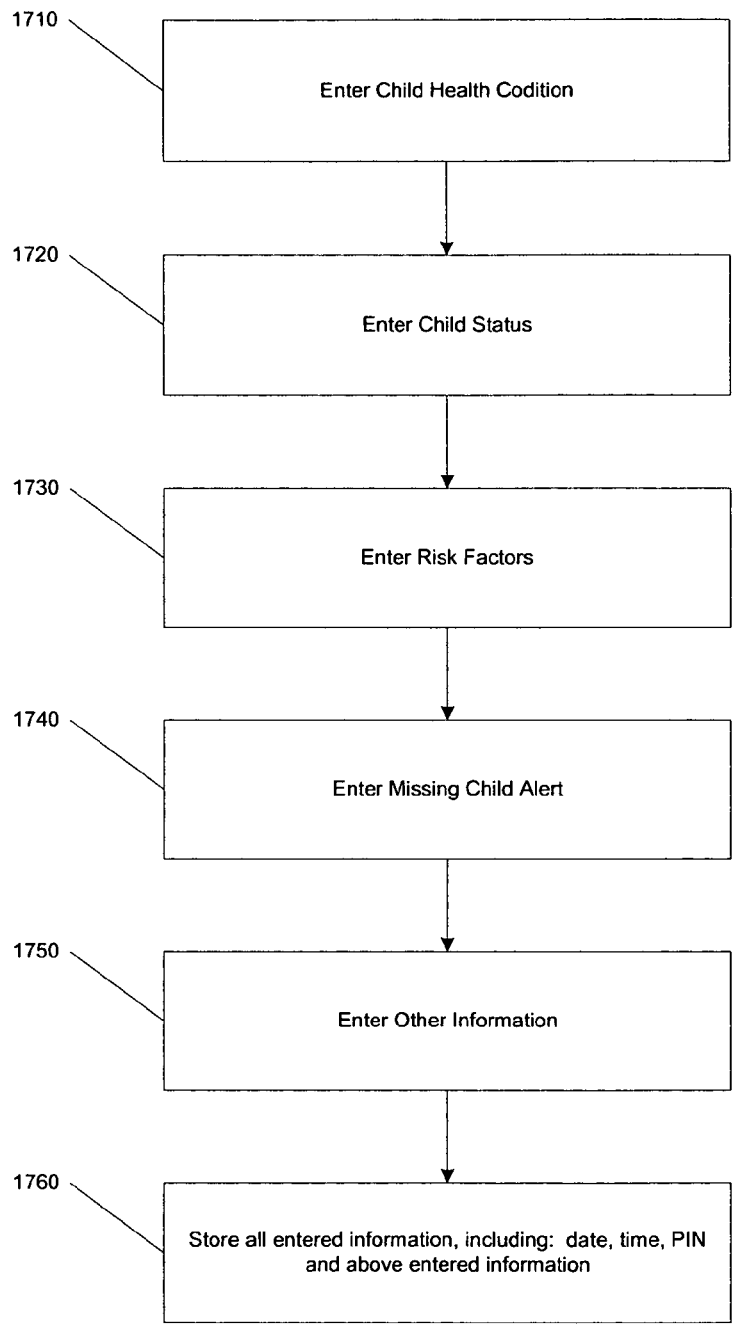
FIG. 17 is a flow chart of the standard check-in procedure process in an exemplary embodiment consistent with the present invention.

FIG. 17 is a flow chart of the standard check-in procedure 1650 consistent with the present invention. At stage 1710, the reporter may enter the child's health condition. For example, physical and mental well being information may be entered, such as indications of decreased weight or height, extensive body bruises, bone fractures, or child wellness. At stage 1720, the reporter may enter child status information. At stage 1730, the reporter may enter risk factor information, for example: the child harm's himself, uses drugs, runs away from home, or is excessively absent from school. At stage 1740, the reporter may indicate that the child is missing, which may activate a missing child alert. At stage 1750, other information may be entered, for example GPS information regarding the location of the child or a photograph of the child. At stage 1760, the child update information is stored, including, for example: the date, time, and PIN of the reporter.

Figure 18:
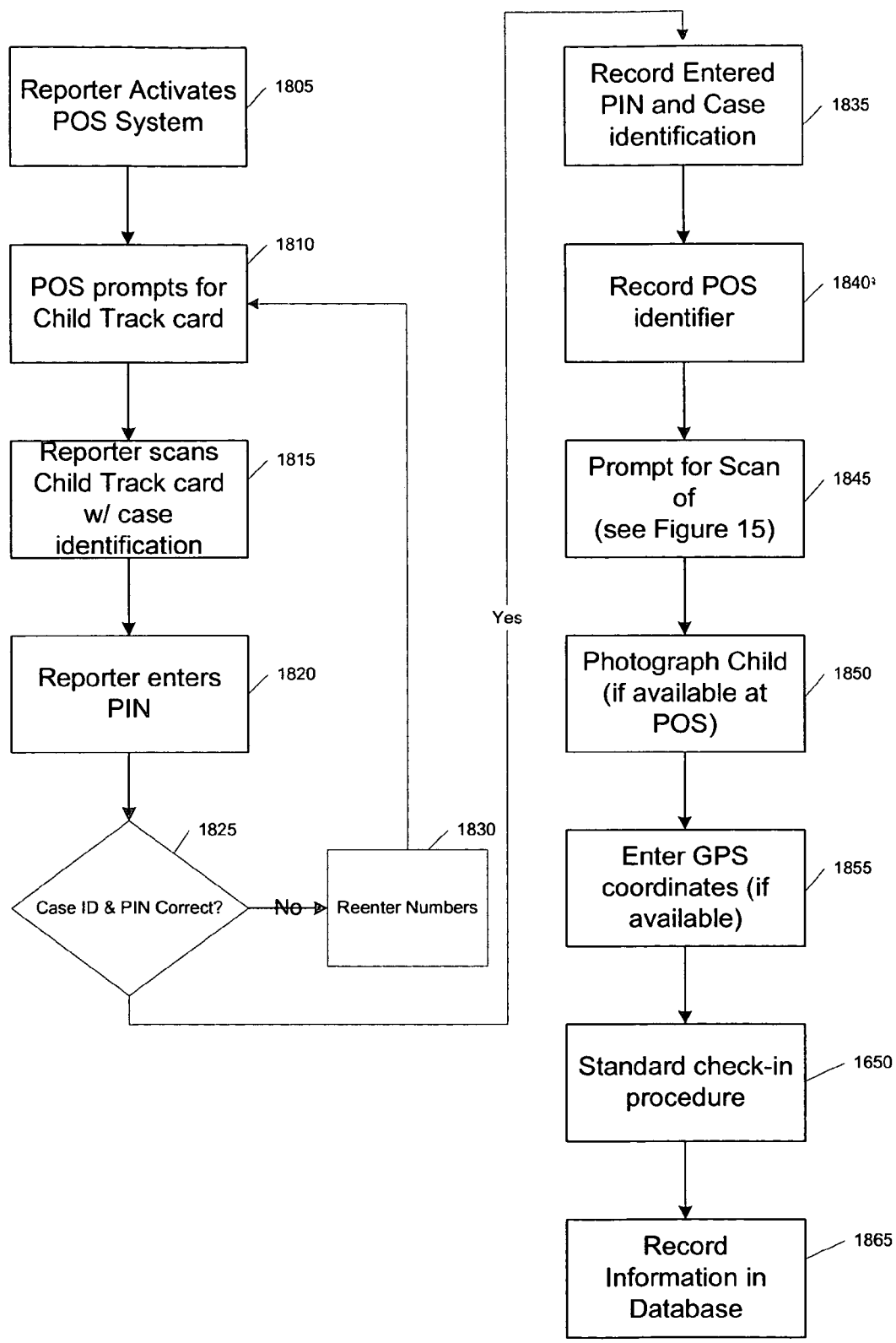
FIG. 18 is a flow chart of the POS child update information process in an exemplary embodiment consistent with the present invention.

FIG. 18 is a flow chart of the POS child update information process consistent with the present invention. Generally, this process will be used by a caregiver or caseworker to provide child update information to the childcare system. In this fashion, the child welfare system may keep tabs on the whereabouts and status of both children and caregivers. Of course, the POS child update information process can be used by any stakeholder to provide child update information to Child Track$^{SM}$ system. At stage 1805, the reporter, for example the caseworker or the caregiver, may activate the POS system. At stage 1810, the POS system may prompt the reporter for the child's Child Track$^{SM}$ card. At stage 1815, the reporter scans the child's Child Track$^{SM}$ card through the POS terminal for transmission of the child's case identification number to the POS system. At stage 1820, the reporter enters his Personal Identification Number (PIN), so that the POS system will know the identity of the reporter. At stage 1825, the POS system may verify that the case identification number and PIN are accurate, requesting the reentry of numbers at stage 1830 if there is an error.

Should the case identification number and PIN be correct, at stage 1835, the POS system may record the entered PIN and scanned case identification number. At stage 1840, the POS terminal identifier may be recorded. At stage 1845, the POS terminal may prompt for the scanning of child update information using, for example, the scannable child services card 1510 illustrated in FIG. 15. At this point, the reporter may utilize scannable child services card 1510 or a similar card. At stage 1850, the child's photograph may be uploaded to Child Track$^{SM}$ system through the POS terminal or another interfaced device. At stage 1855, the GPS coordinates may be input to Child Track$^{SM}$ system. This would be used, for example, in the case of a POS terminal integrated with a mobile platform. At stage 1650, the standard check-in procedure may be initiated to augment or replace the use of the scannable child services card. This procedure 1650 may be utilized by engaging the features of IVR system. At stage 1865, the child update information is recorded in Child Track$^{SM}$ database.

Figure 19:
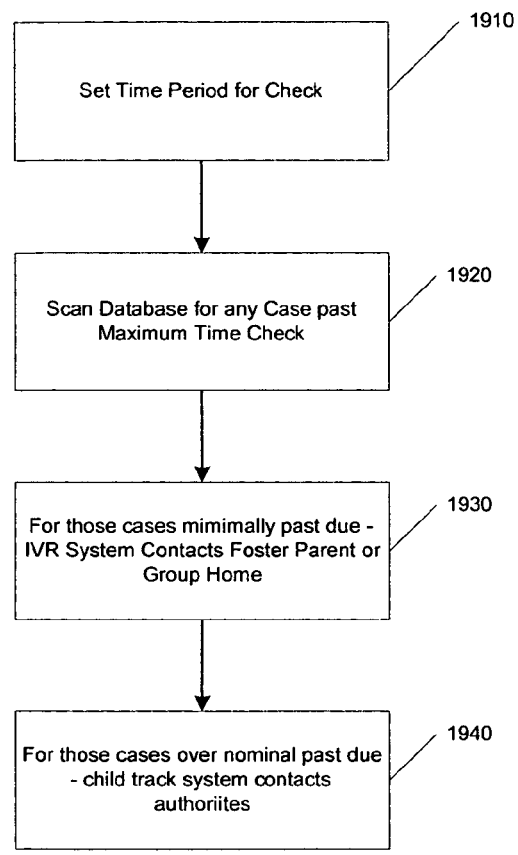
FIG. 19 is a flow chart of the child status check process in an exemplary embodiment consistent with the present invention.

FIG. 19 is a flow chart of the child status check process consistent with the present invention. The child status check process may be run by Child Track$^{SM}$ system, for example on Child Track$^{SM}$ server, periodically to ensure that child updates are being performed by caregivers in a timely fashion. In an exemplary embodiment consistent with the present invention, child status checks are run on a daily basis to ensure that child updates are being performed daily.

At stage 1910, the time period for which to run a check is established, for example, daily. At stage 1920, when a child status check is executed, the child record database is scanned for any cases that are past the maximum time check. The maximum time check in an exemplary embodiment consistent with the present invention is one day. At stage 1930, for those cases where the child update has not been performed and are minimally past due, for example one or two days, Child Track$^{SM}$ system, for example using IVR system, may initiate a telephone call to the caregiver to prompt the caregiver for a child update. At stage 1940, for those cases that are past minimally past due, for example three days past due, Child Track$^{SM}$ system may initiate an alert to authorities in the child welfare system or law enforcement, by telephone call, email, or other appropriate method.

Figure 20:
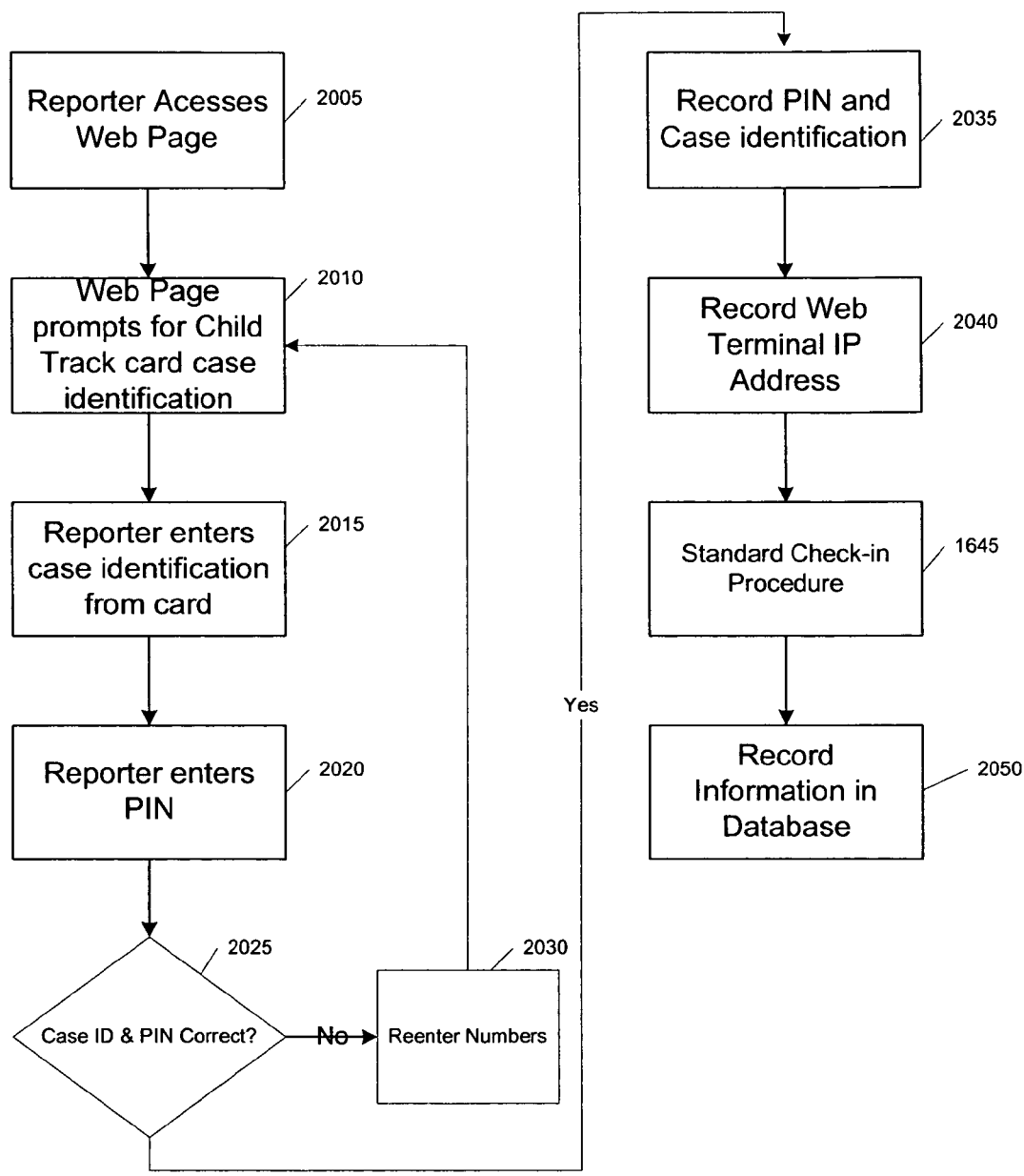
FIG. 20 is a flow chart of the network terminal child update information process in an exemplary embodiment consistent with the present invention.

FIG. 20 is a flow chart of the network terminal child update information process consistent with the present invention. Generally, this process will be used by a caregiver or caseworker to provide child update information to the childcare system. Of course, the network terminal child update information process can be used by any stakeholder to provide child update information to Child Track$^{SM}$ system. At stage 2005, the reporter, for example the caseworker or the caregiver, may connect via the network terminal system to the child track system's server or web server. At stage 2010, the server may prompt the reporter for the case identification number unique to the child of interest, where the case identification number is printed or encoded on the child's Child Track$^{SM}$ card. At stage 2015, the reporter may enter the case identification number into the network terminal for transmission to the server of the child track system. At stage 2020, the reporter enters his Personal Identification Number (PIN), so that the server will know the identity of the reporter. At stage 2025, the server may verify that the case identification number and PIN are accurate, requesting the reentry of numbers at stage 2030 if there is an error.

Should the case identification number and PIN be correct, at stage 2035, the server may records the PIN and case identification number. At stage 2040, the network terminal identification, for example the IP address, is recorded. At stage 1645, standard child check-in procedure is initiated. At state 2050, the information is recorded in the database.

FIGS. 21-24 are reporting screens providing more detail on an exemplary child welfare tracking system, which the modules described above, or other modules, can carry out. The reporting screens feature hyperlinks to permit easy navigation between caregivers, such as foster parents, and children under their care. Those skilled in the art will appreciate that the reporting screens may be implemented in a variety of fashions. Although these reporting screens illustrate most features of the processes, they may, for purposes of clarity, omit some features in the following text.

Figure 21:
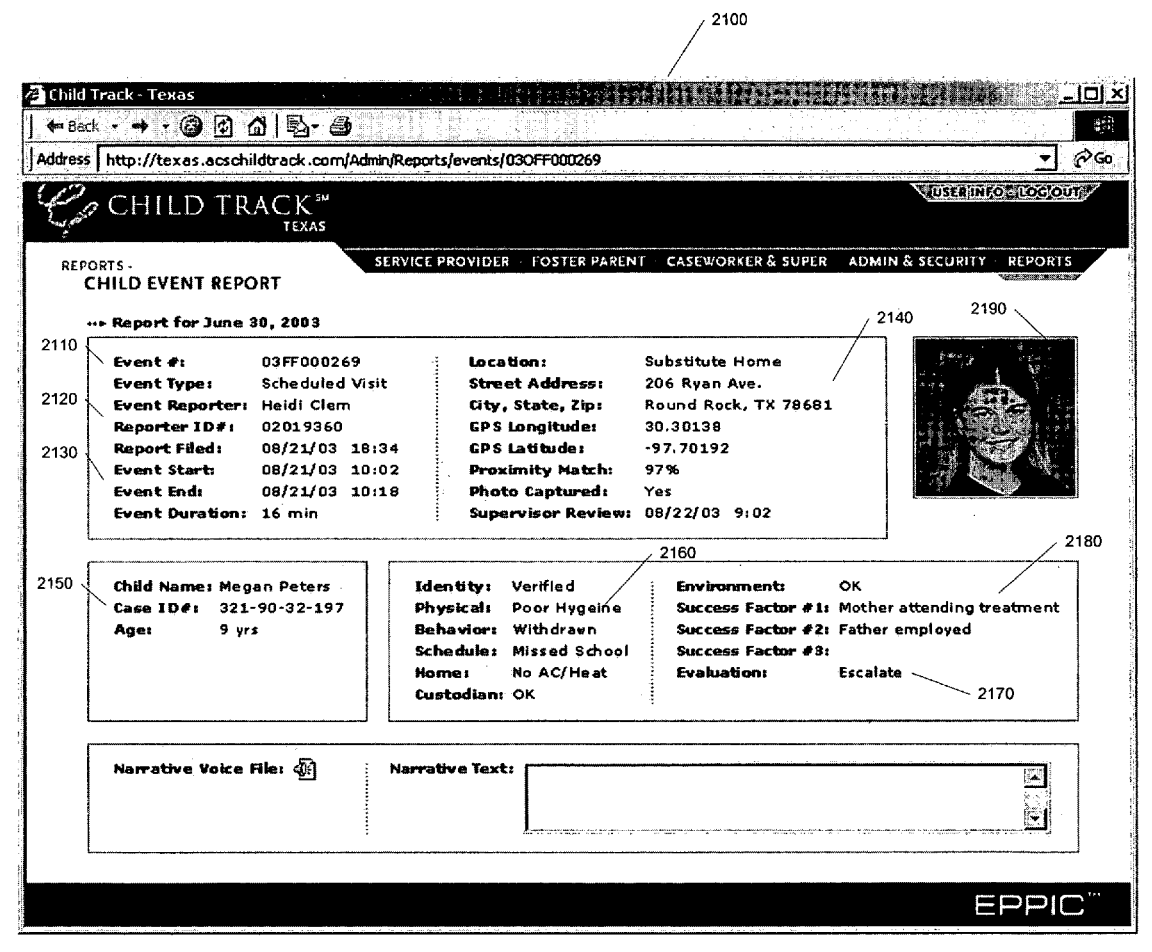

FIG. 21 is a child event report screen 2100 consistent with the present invention. Child report screen 2100 illustrates a single child update information event, noted by a unique event number 2110, for a single child under care, "Megan Peters." Child report screen 2100 displays both reporter information and child status information. For example, regarding reporter information, child event report screen 2100 may include the PIN of the reporter 2120, and a time and date stamp of the event 2130. A location of the event 2140 may also be presented on screen 2100. Further, screen 2100 may display the case identifier 2150 for the child under care. Further child update information may be displayed, including the health of the child 2160, status of the child 2170, information about the child's environment 2180, and a captured photograph of the child 2190.

Figure 22:
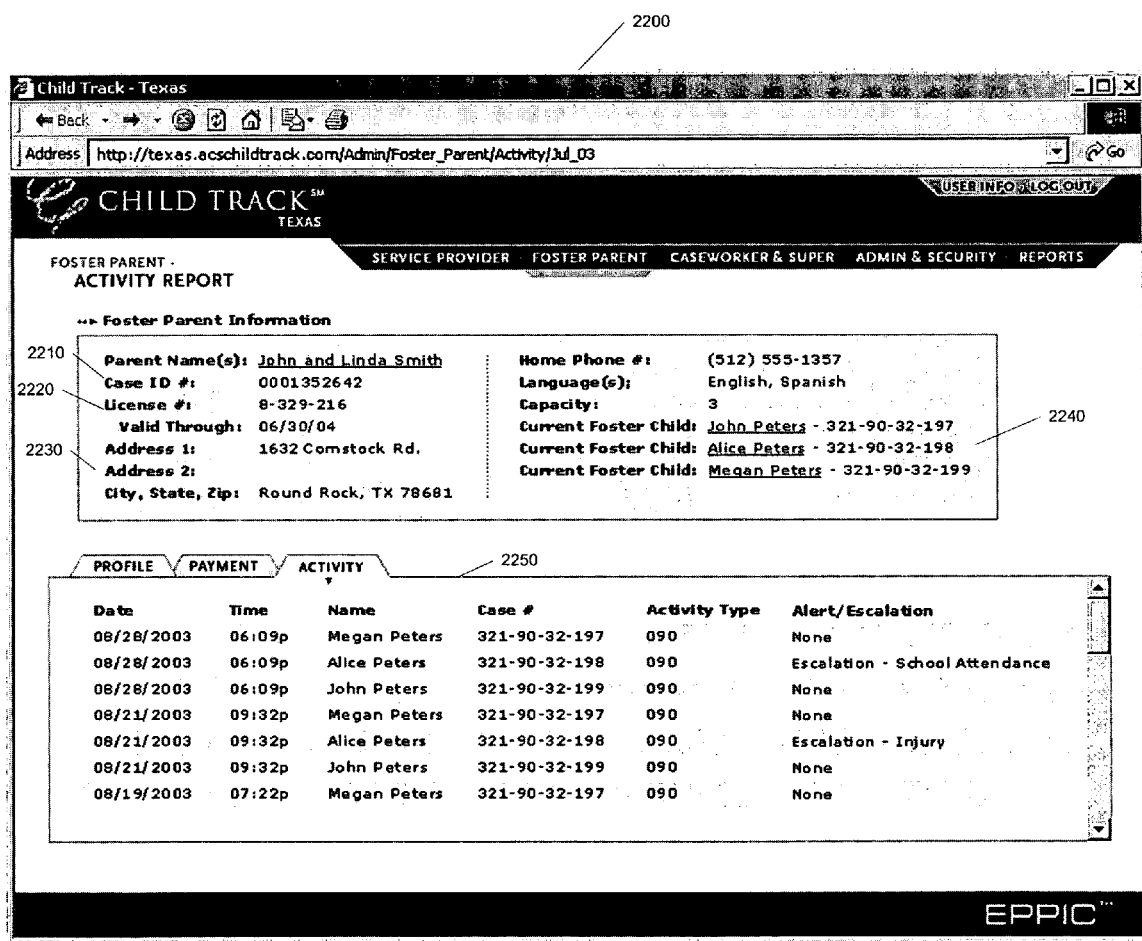
FIG. 22 is a foster parent report screen consistent with the present invention.

FIG. 22 is a foster parent report screen 2200 consistent with the present invention. Foster parent report screen 2200 displays activities related to a foster parent. Screen 2200 presents a case identification number 2210, a license number 2220, and an address 2230 of the foster parents. A list of assigned foster children 2240 is shown as hyperlinks that bring up an associated child report screen when selected. The bottom portion of screen 2200 displays a list of recent activities 2250, i.e. events, for the assigned foster children. Tabs on the list allow switching between a list of recent activities, payment activities, and profile information for the foster parents.

Figure 23:
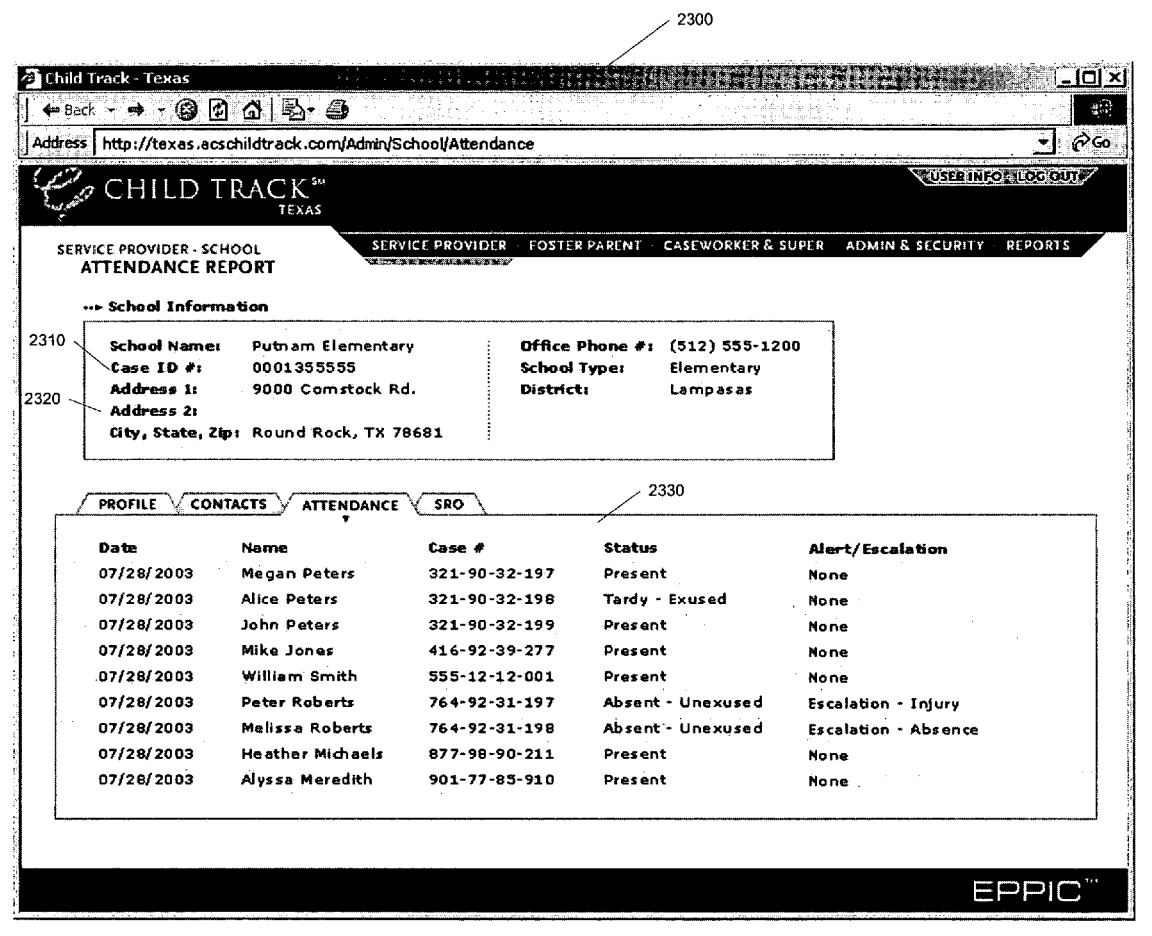

FIG. 23 is an attendance report screen 2300 consistent with the present invention. Attendance report screen 2300 displays attendance for one or more children under state care. Screen 2300 presents the case identification number 2310 for the school, as well as the school's address information 2320. The bottom portion of screen 2300 displays a recent list of events 2330 for children under foster care. In the screen illustrated, the events display children both present, tardy, and absent. Those skilled in the art will appreciate that list 2330 could be tailored to only show, for example, children absent. The bottom portion of screen 2300 is tabbed to switch the display between the attendance list, a contacts list, and a profile of the school.

Figure 24:
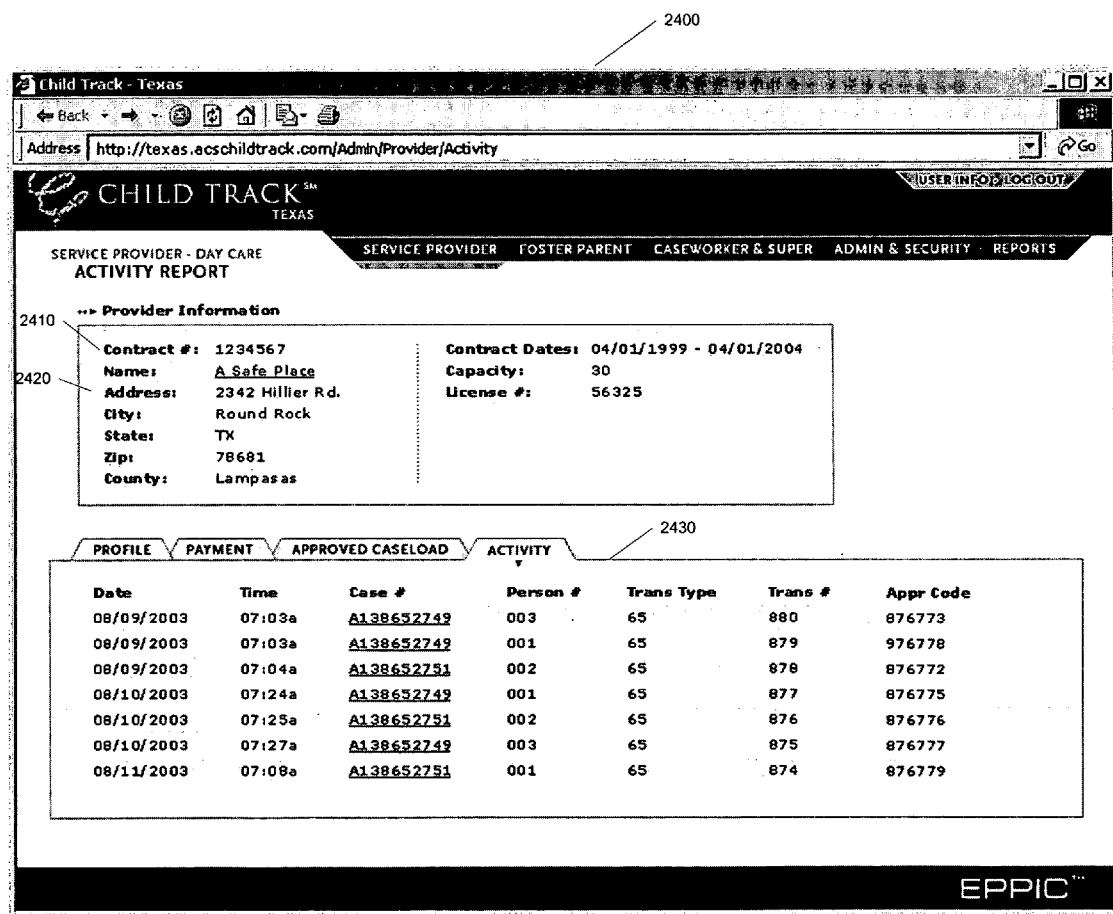
FIG. 24 is a day care activity report screen consistent with the present invention.

FIG. 24 is a day care activity report screen 2400 consistent with the present invention. Day care activity report screen 2400 displays events tracked for one or more children under sate care at a day care facility. Screen 24000 presents case identification number 2410 for the day care facility, as well as the day care facility's address information 2420. The bottom portion of screen 2400 displays a recent list of events 2430 for children under foster care at the day care facility. In the screen illustrated, the events displays children being checked into the facility. The bottom portion of screen 2400 is tabbed to switch the display between the activity list, an approved caseload list, payment information, and profile information.

Those skilled in the art will appreciate that similar report screens, and variants, can be generated for a wide combination of caregivers. For example, a hospital or clinic activity report screen may be generated.

The foregoing description of embodiments of the invention has been presented for purposes of illustration and description. It is not exhaustive and does not limit the invention to the precise form disclosed. Modifications and variations are possible in light of the above teachings or may be acquired from practicing of the invention. For example, the described implementation includes a particular network configuration but the present invention may be implemented in a variety of data communication network environments using software, hardware, or a combination of hardware and software to provide the processing functions.

Those skilled in the art will appreciate that all or part of systems and methods consistent with the present invention may be stored on or read from other computer-readable media, such as: secondary storage devices, like hard disks, floppy disks, and CD-ROM; a carrier wave received from the Internet; or other forms of computer-readable memory, such as read-only memory (ROM) or random-access memory (RAM).

Furthermore, one skilled in the art will also realize that the processes illustrated in this description may be implemented in a variety of ways and include multiple other modules, programs, applications, scripts, processes, threads, or code sections that all functionally interrelate with each other to accomplish the individual tasks described above for each module, script, and daemon. For example, it is contemplated that these programs modules may be implemented using commercially available software tools, using custom object-oriented code written in the C++ programming language, using applets written in the Java programming language, or may be implemented as with discrete electrical components or as one or more hardwired application specific integrated circuits (ASIC) custom designed just for this purpose.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A computer-implemented method of monitoring welfare of a child in a welfare system comprising:
    prompting a reporter, through a point of sale terminal, to swipe a case identification card associated with a welfare system and issued to a child placed under the care of the reporter, wherein:
        the reporter is one of a foster parent and a group home worker;
    receiving, by a server, information stored in the case identification card through a point of sale interface separate from the point of sale terminal;
    in response to receiving the information from the case identification card, prompting the reporter to provide child update information using the point of sale terminal, wherein the child update information is related to events occurring in the life of the child and includes a location of the child received via a location device in the proximity of the child;

receiving information from a child services card separate from the case identification card, wherein the reporter scans at least one of a plurality of bar codes displayed on the child services card, the bar codes corresponding to at least one of a physical condition of the child and a risk factor of the child;

when an identifier fails to match a stored identifier associated with the reporter:
  receiving an explanation by the reporter; and
  storing, in a database, the identifier and the explanation entered by the reporter;

storing the child update information, the location information of the child, and the information received from the child services card in the database;

receiving, by the server, welfare benefit payment information related to the child, the welfare benefit payment information comprising information related to a disbursement made by the welfare system for the child;

storing the welfare benefit payment information together with the child update information, the location information of the child, and the information received from the child services card in the database;

integrating, by the welfare system, the child update information, the location information of the child, the information received from the child services card, and the welfare benefit payment information to provide a centralized system for a plurality of stakeholders to monitor physical and financial welfare of the child;

automatically providing, in real time, the child update information, the location information of the child, and the information received from the child services card to a plurality of law enforcement officials through a mobile platform;

periodically accessing, by the server, the database to determine if additional child update information for the child has not been stored for a period of time;

when a predetermined time period passes without the additional child update information being stored:
  generating a child alert; and
  sending, using an interactive voice response system, the child alert to the reporter; and when a second predetermined time period passes without the additional child update information being stored, sending, using the interactive voice response system, the child alert to one or more stakeholders.

2. The computer-implemented method of claim 1, wherein the child update information comprises child status information and reporter information.

3. The computer-implemented method of claim 2, wherein the reporter information comprises at least one of a case identifier, a Personal Identification Number (PIN) of the reporter, and a GPS location of the reporting terminal.

4. The computer-implemented method of claim 2, wherein the child status information comprises at least one of a health of the child, a status of the child, information about the child's environment, and a picture of the child.

5. The computer-implemented method of claim 1, further comprising processing payments based on the child update information.

6. The computer-implemented method of claim 1, further comprising providing the case identification card to the child.

7. The computer-implemented method of claim 1, further comprising receiving a scan of the case identification card.

8. The computer-implemented method of claim 1, wherein the child update information is received using an interactive voice response system.

9. The computer-implemented method of claim 1, wherein the child placed under the care of the reporter lives in a home with the reporter.

10. The computer-implemented method of claim 1, wherein the reporter is a foster parent.

11. The computer-implemented method of claim 1, wherein the child update information, the location information of the child, and the information received from the child services card are automatically provided to a plurality of law enforcement officials in response to receiving, by the welfare system, the child update information, the location information of the child, and the information received from the child services card provided by the reporter.

12. A computer system for monitoring welfare of a child in a welfare system, comprising:
  a memory;
  a server;
  a database;
  a reader device configured to read a case identification card associated with a welfare system and issued to a child placed under the care of a reporter, wherein:
    the reporter is one of a foster parent and a group home worker;
  a camera configured to obtain a photograph of the child; and
  a processor coupled to the memory, the server, and the database, the processor configured to:
  prompt the reporter, through a point of sale terminal, to swipe the case identification card;
  receive, by the server, information stored in the case identification card through a point of sale interface separate from the point of sale terminal;
  in response to receiving the information from the case identification card, prompt the reporter to provide child update information using the point of sale terminal, wherein the child update information is related to events occurring in the life of the child and includes a location of the child received via a location device in the proximity of the child;
  receive information from a child services card separate from the case identification card, wherein the reporter scans at least one of a plurality of bar codes displayed on the child services card, the bar codes corresponding to at least one of a physical condition of the child and a risk factor of the child;
  when an identifier fails to match a stored identifier associated with the reporter:
    receive an explanation entered by the reporter; and
    store, in the database, the identifier and the explanation entered by the reporter;
  store the child update information, the location information of the child, and the information received from the child services card in the database;
  receive, by the server, welfare benefit payment information related to the child, the welfare benefit payment information comprising information related to a disbursement made by the welfare system for the child;
  store the welfare benefit payment information together with the child update information, the location information of the child, and the information received from the child services card in the database;
  integrate, by the welfare system, the child update information, the location information of the child, the information received from the child services card, and the welfare benefit payment information to provide a centralized system for a plurality of stakeholders to monitor physical welfare and financial welfare of the child;

automatically provide, in real time, the child update information, the location information of the child, and the information received from the child services card to a plurality of law enforcement officials through a mobile platform;

periodically access, by the server, the database to determine if additional child update information for the child has not been stored for a period of time;

when a predetermined time period passes without the additional child update information being stored:

generate a child alert; and send, using an interactive voice response system, the child alert to the reporter; and when a second predetermined time period passes without the additional child update information being stored, send, using the interactive voice response system, the child alert to one or more stakeholders.

13. The system of claim 12, wherein the child update information comprises child status information and reporter information.

14. The system of claim 13, wherein the reporter information comprises at least one of a case identifier, a Personal Identification Number (PIN) of the reporter, and a GPS location of the reporting terminal.

15. The system of claim 13, wherein the child status information comprises at least one of a health of the child, a status of the child, information about the child's environment, and a picture of the child.

16. The system of claim 12, wherein the processor is further configured to process payments based on the child update information.

17. The system of claim 12, wherein the system further includes an interactive voice response system configured to receive the child update information.

18. The system of claim 12, wherein the child placed under the care of the reporter lives in a home with the reporter.

19. The system of claim 12, wherein the reporter is a foster parent.

20. The system of claim 12, wherein the child update information, the location information of the child, and the information received from the child services card are automatically provided to a plurality of law enforcement officials in response to receiving, by the welfare system, the child update information, the location information of the child, and the information received from the child services card provided by the reporter.

* * * * *